United States Patent
Kuroda

(10) Patent No.: US 8,704,609 B2
(45) Date of Patent: Apr. 22, 2014

(54) ELECTRONIC CIRCUIT

(75) Inventor: Tadahiro Kuroda, Kanagawa (JP)

(73) Assignee: Keio University, Tokyo (JP)

( * ) Notice: Subject to any disclaimer, the term of this patent is extended or adjusted under 35 U.S.C. 154(b) by 423 days.

(21) Appl. No.: 13/125,285

(22) PCT Filed: Sep. 8, 2009

(86) PCT No.: PCT/JP2009/065647
§ 371 (c)(1),
(2), (4) Date: May 13, 2011

(87) PCT Pub. No.: WO2010/047187
PCT Pub. Date: Apr. 29, 2010

(65) Prior Publication Data
US 2011/0260786 A1  Oct. 27, 2011

(30) Foreign Application Priority Data
Oct. 21, 2008  (JP) ................. 2008-270752

(51) Int. Cl.
*H01P 5/04* (2006.01)
*H01P 1/00* (2006.01)

(52) U.S. Cl.
USPC ......................... 333/24 R; 333/245

(58) Field of Classification Search
USPC ......... 333/24 R, 245, 247; 174/260; 307/104; 361/760; 455/292
See application file for complete search history.

(56) References Cited

U.S. PATENT DOCUMENTS

| 7,546,106 | B2 * | 6/2009 | Kuroda et al. | 455/292 |
| 7,768,790 | B2 * | 8/2010 | Kuroda et al. | 361/760 |
| 8,391,040 | B2 * | 3/2013 | Suzuki et al. | 365/51 |
| 2011/0156488 | A1 * | 6/2011 | Kuroda | 307/104 |

FOREIGN PATENT DOCUMENTS

| JP | 05-128324 A | 5/1993 |
| JP | 2000-137779 A | 5/2000 |
| JP | 2005-110131 A | 4/2005 |
| JP | 2005-509353 | 4/2005 |

(Continued)

OTHER PUBLICATIONS

Mizoguchi, D. et al., A 1/2Gb/s/pin Wireless Superconnect Based on Inductive Inter-Chip Signaling (IIS), 2004 IEEE International Solid-State Circuits Converence, 2004, Digest of Technical Papers, Feb. 15, 2004, vol. 1, Paper 7.6.

(Continued)

*Primary Examiner* — Dean O Takaoka
(74) *Attorney, Agent, or Firm* — Knobbe Martens Olson & Bear LLP

(57) ABSTRACT

An electronic circuit includes: a first substrate having a first coil and a first transmission circuit connected to the first coil that asynchronously outputs the signal to the first coil; a second substrate having a second coil at a position corresponding to the first coil that forms a communication channel with the first coil to receive the signal and a third coil connected to the second coil by a wire on the substrate and transmits the signal; and a third substrate having a fourth coil at a position corresponding to the third coil that forms a communication channel with the third coil and a first reception circuit connected to the fourth coil to asynchronously receive the signal. The substrates are stacked on one another, and the first transmission circuit changes a current to the first coil each time a logical value of transmission data changes.

10 Claims, 19 Drawing Sheets

(56) References Cited

FOREIGN PATENT DOCUMENTS

| | | |
|---|---|---|
| JP | 2005-228981 A | 8/2005 |
| JP | 2005-347286 A | 12/2005 |
| JP | 2005-348264 A | 12/2005 |
| JP | 2006-050354 A | 2/2006 |
| JP | 2006-066454 A | 3/2006 |
| JP | 2006-93659 A | 4/2006 |
| JP | 2006-093659 A | 4/2006 |
| JP | 2006-105630 A | 4/2006 |
| JP | 2006-173415 A | 6/2006 |
| JP | 2006-173986 A | 6/2006 |
| JP | 2006-246372 A | 9/2006 |
| JP | 2007-094875 A | 4/2007 |
| JP | 2007-094875 A | 4/2007 |

OTHER PUBLICATIONS

Office Action dated Dec. 25, 2012 in corresponding Japan Patent Application No. 2008-270752.

Hiroki Ishikuro, et al.; An Attachable Wireless Chip Access Interface for Arbitrary Data Rate Using Pulse-Based Inductive-Coupling through LSI Package; Proximity Data and Power Transmission; 20.3; 2007 IEEE International Solid-State Circuits Conference; pp. 360, 361, 608.

Noriyuki Miura, et al.; A 1Tb/s 3W Inductive-Coupling Transceiver for Inter-Chip Clock and Data Link; Technology and Architecture Directions; 23.4; 2006 IEEE International Solid-State Circuits; pp. 11-13.

Noriyuki Miura, et al.; A 195Gb/s 1.2W 3D-Stacked Inductive Inter-Chip Wireless Superconnect with Transmit Power Control Scheme; Low-Power Wireless and Advanced Integration; 14.5; 2005 IEEE International Solid-State Circuits Conference; pp. 264, 265, 597.

Noriyuki Miura, et al.; Cross Talk Countermeasures in Inductive Inter-chip Wireless Superconnect; Department of Electronics and Electrical Engineering, Keio University; pp. 1-4.

Noriyuki Miura, et al.; Analysis and Design of Transceiver Circuit and Inductor Layout for Inductive Inter-chip Wireless Superconnect; Department of Electronics and Electrical Engineering, Keio University; pp. 246-249.

Daisuke Mizoguchi, et al.; A 1.2Gb/s/pin Wireless Superconnect Based on Inductive Inter-chip Signaling (IIS); Scaling Trends; 7.6; 2004 IEEE International Solid-State Circuits Conference; pp. 1-3.

Stephen Mick, et al.; 4 Gbps High-Density AC Coupled Interconnection; Department of Electrical and Computer Engineering North Carolina State University; IEEE 2002 Custom Integrated Circuits Conference; pp. 133-140.

Karthik Chandrasekar, et al.; Inductively Coupled Board-to-Board Connectors; North Carolina State University; 2005 IEEE Electronic Components and Technology Conference; pp. 1109-1113.

Jian Xu; Dissertation—AC Coupled Interconnect for Inter-chip Communications; North Carolina State University; Electrical Engineering, 2006.

International Search Report; Application No. PCT/JP2009/065645.

Noriyuki Miura, et al., An 11Gb/s Inductive-Coupling Link with Burst Transmission; TD: Trends in Signal and Power Transmission/ 15.7, 2008 IEEE International Solid-State Circuits Conference, pp. 298-299, 614.

Noriyuki Miura, et al., A 0.14pJ/b Inductive-Coupling Inter-Chip Data Transceiver with Digitally-Controlled Precise Pulse Shaping, TD: Proximity Data and Power Transmission. 20.2 , 2007 IEEE International Solid-State Circuits Conference, pp. 358-359, 608.

Mick, Stephen, et al., 4 Gbps high-density AC coupled interconnection, Proceedings of the IEEE 2002 Custom Integrated Circuits Conference, 2002, USA, IEEE, Aug. 7, 2002, pp. 133-140.

Davis, W. Rhett, et al., Demystifying 3D ICs: the pros and cons of going vertical, IEEE Design & Test of Computers, USA, IEEE, Dec. 2005, vol. 22, Issue 6, pp. 498-510.

Office Action mailed Jun. 25, 2013 in corresponding Japanese Patent Application No. 2008-270752.

\* cited by examiner

Fig.8
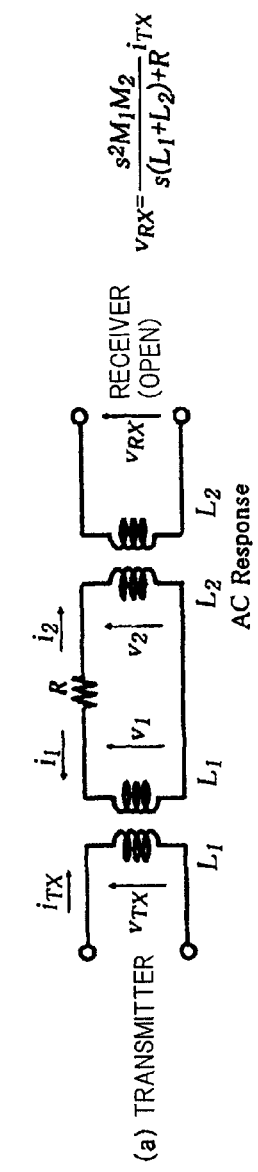
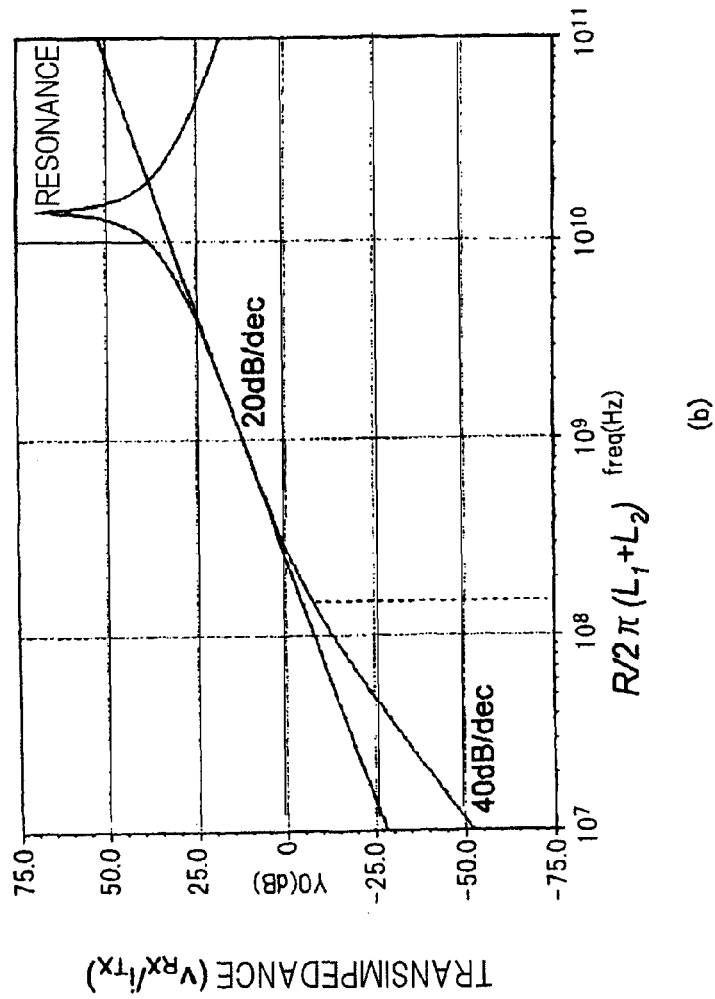
(a) TRANSMITTER  AC Response  RECEIVER (OPEN)
$$v_{RX} = \frac{s^2 M_1 M_2}{s(L_1+L_2)+R} i_{TX}$$
(b)
Fig.9
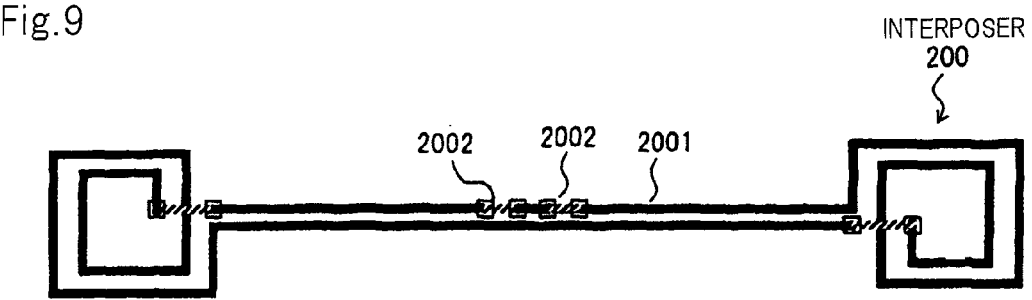
INTERPOSER 200

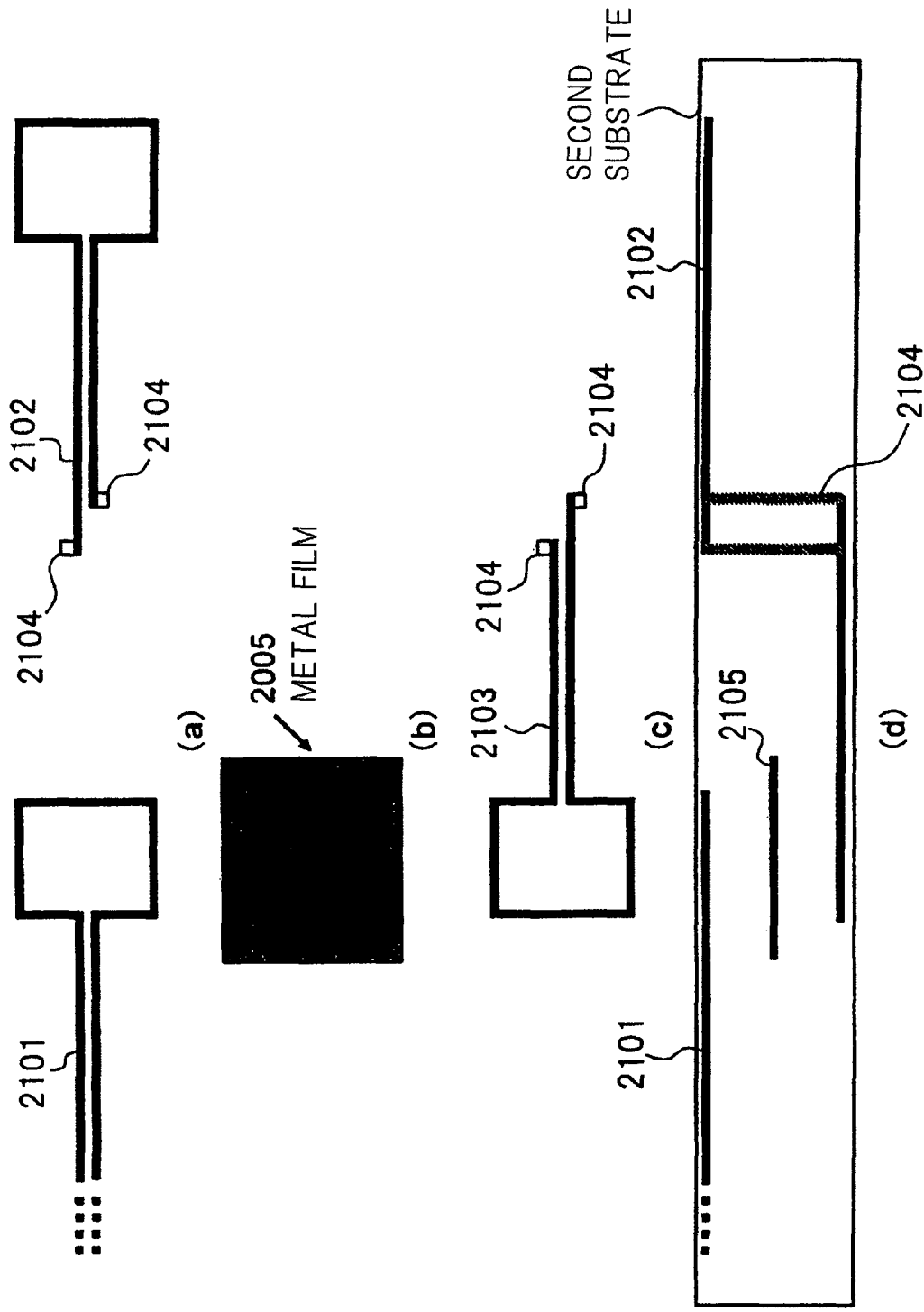

ELECTRONIC CIRCUIT

CROSS-REFERENCE TO RELATED APPLICATIONS

This application is the U.S. National Phase under 35. U.S.C. §371 of International Application PCT/JP2009/065647, filed Sep. 8, 2009, which claims priority to Japanese Patent Application No. 2008-270752, filed Oct. 21, 2008. The International Application was published under PCT Article 21(2) in a language other than English.

TECHNICAL FIELD

The present invention relates to an electronic circuit that provides reliable communication between integrated-circuit (IC) bare chips stacked on one another. The present invention can be applied to communication between printed wiring boards, such as contactless memory cards.

BACKGROUND ART

Electronic circuits have been proposed that provide communication between large scale integration (LSI) chips stacked on one another or between printed wiring boards disposed close to each other by inductive coupling between coils formed by wiring on the chips or boards (see Patent Literatures 1 to 7 and Non-Patent Literatures 1 to 11).

For example, Patent Literature 1 discloses a technique that involves a transmitter that applies a pulse current signal ($I_T$) of a single, positive or negative, polarity (referred to as "single pulse" hereinafter) to a transmission coil and a receiver formed by a synchronous comparator that detects and receives one of the pulses (that is, the first half or second half pulse) of a pulse voltage signal ($V_R$) of double, positive and negative, polarities (referred to as "double pulse" hereinafter) produced in a reception coil inductively coupled to the transmission coil.

Using two coils coupled to each other (referred to as an interposer hereinafter) for communication between boards has already been known (see Non-Patent Literatures 9 to 11).

CITATION LIST

Patent Literature

Patent Literature 1: JP2005-228981A
Patent Literature 2: JP2005-348264A
Patent Literature 3: JP2006-050354A
Patent Literature 4: JP2006-066454A
Patent Literature 5: JP2006-105630A
Patent Literature 6: JP2006-173986A
Patent Literature 7: JP2006-173415A
Non Patent Literature 1: D. Mizoguchi et al, "A 1.2 Gb/s/pin Wireless Superconnect based on Inductive Inter-chip Signaling (IIS)," IEEE International Solid-State Circuits Conference (ISSCC'04), Dig. Tech. Papers, pp. 142-143, 517, February 2004.
Non Patent Literature 2: N. Miura et al, "Analysis and Design of Transceiver Circuit and Inductor Layout for Inductive Inter-chip Wireless Superconnect," Symposium on VLSI Circuits, Dig. Tech. Papers, pp. 246-249, June 2004.
Non Patent Literature 3: N. Miura et al, "Cross Talk Countermeasures in Inductive Inter-Chip Wireless Superconnect," in Proc. IEEE Custom Integrated Circuits Conference (CICC'04), pp. 99-102, October 2004.
Non Patent Literature 4: N. Miura, D. Mizoguchi, M. Inoue, H. Tsuji, T. Sakurai, and T. Kuroda, "A 195 Gb/s 1.2 W 3D-Stacked Inductive Inter-Chip Wireless Superconnect with Transmit Power Control Scheme," IEEE International Solid-State Circuits Conference (ISSCC'05), Dig. Tech. Papers, pp. 264-265, February 2005.
Non Patent Literature 5: N. Miura, D. Mizoguchi, M. Inoue, K. Niitsu, Y. Nakagawa, M. Tago, M. Fukaishi, T. Sakurai, and T. Kuroda, "A 1Tb/s 3 W Inductive-Coupling Transceiver for Inter-Chip Clock and Data Link," IEEE International Solid-State Circuits Conference (ISSCC'06), Dig. Tech. Papers, pp. 424-425, February 2006.
Non Patent Literature 6: N. Miura, H. Ishikuro, T. Sakurai, and T. Kuroda, "A 0.14 pJ/b Inductive-Coupling Inter-Chip Data Transceiver with Digitally-Controlled Precise Pulse Shaping," IEEE International Solid-State Circuits Conference (ISSCC'07), Dig. Tech. Papers, pp. 264-265, February 2007.
Non Patent Literature 7 H. Ishikuro, S. Iwata, and T. Kuroda, "An Attachable Wireless Chip Access Interface for Arbitrary Data Rate by Using Pulse-Based Inductive-Coupling through LSI Package," IEEE International Solid-State Circuits Conference (ISSCC'07), Dig. Tech. Papers, pp. 360-361, 608, February 2007.
Non Patent Literature 8: N. Miura, Y. Kohama, Y. Sugimori, H. Ishikuro, T. Sakurai, and T. Kuroda, "An 11 Gb/s Inductive-Coupling Link with Burst Transmission," IEEE International Solid-State Circuits Conference (ISSCC08), Dig. Tech. Papers, pp. 298-299, February 2008.
Non Patent Literature 9: S. Mick, J. Wilson and P. Franzon, "4 Gbps high-density AC coupled interconnection," *Proc. IEEE Custom Integrated Circuits Conf.*, May 2002, pp. 133-140.
Non Patent Literature 10: K. Chandrasekar, Z. Feng, J. Wilson, S. Mick, P. Franzon, "Inductively coupled board-to-board connectors," *Proc. IEEE Electronic Components and Technology*, May 2005, pp. 1109-1113.
Non Patent Literature 11: Jian Xu, "AC COUPLED INTERCONNECT FOR INTER-CHIP COMMUNICATIONS," PhD Dissertation, Graduate Faculty of North Carolina State University, 2006.

SUMMARY OF INVENTION

Technical Problem

In communication using inductive coupling, misalignment of the central axes of coils used for communication causes attenuation of the reception signal to lead to interruption of the communication or an increase of the required amount of electrical power.

In addition, crosstalk with an adjacent communication channel increases to raise the bit error rate of the communication. If the central axes of the coils are misaligned by about a half of the diameter of the coils, the reception power decreases to about one third.

In practice, however, it is often difficult to align the central axes of the coils. For example, consider a case where a memory chip and a processor chip are stacked on one another in such a manner that the chips can communicate with each other by inductive coupling.

For example, in the situation where A company, which manufactures and sells integrated chips comprising a stack of memory chips and a processor chip, wants to purchase the chips from a plurality of vendors for stable supply and decides to purchase memory chips from B and C companies and processor chips from D and E companies, the positions of the coils on the chips supplied from the four manufacturers need to agree with each other.

It is not easy for the four companies to design their respective chips while ensuring the agreement of the coil positions, because memory chips and processor chips are highly versatile, and B, C, D and E companies may have similar business relations with other companies than A company, in which case they cannot determine the coil positions as required by A company. Even if the coil positions could agree with each other, the companies may conduct scaling (miniaturization) of the chips according to their respective programs to make the products more competitive, and the coil positions may eventually disagree with each other.

In addition to the reasons on the side of the manufacturers and vendors, there is another reason why different chips have different constraints on the coil position. For example, due to fear of malfunction due to electromagnetic interference with a memory cell or analog circuit, there may be imposed a constraint in which no coil is placed near a memory cell array or an analog circuit.

In general, a memory cell array covers a substantial area in any chip, so that the remaining area is limited. For three or more chips, the limitation becomes stricter. Thus, it may be impossible to arrange the coils to align the central axes thereof, because of the layout constraint of the chips.

The layout constraint described above can be overcome by using an interposer.

Non-Patent Literatures 9, 10 and 11 are papers published by one research group and refer to a future technique of transmitting a signal using two coils coupled to each other. However, Non-Patent Literatures 10 and 11 published following Non-Patent Literature 9 state that asynchronous communication using two coils coupled to each other is impossible for the current technology and remains a subject of future research. This statement implies that no transmission/reception circuit that achieves such communication was known at that time.

FIG. 15 in Non-Patent Literature 10 is a conceptual view, and Non-Patent Literature 10 points out that the following problems have to be solved to achieve the technique (the underlined part is added in this specification).

FIG. 15 shows a conceptual view of the projected system level application for inductively coupled connectors. (Snip) One of the issues in signaling across a complete system, as shown in FIG. 15, is that a square pulse passing through a double differentiator produces a double pulse. This effect needs to be "passively" equalized through transformer parameter optimization. However, circuits have been built to handle double pulse signals at the receiver input [9].

As described above, Non-Patent Literature 10 shows that an electronic circuit can receive a double pulse described in the document [9]. The document [9] is Non-Patent Literature 2 published by the inventor. Non-Patent Literature 2 shows that a synchronous reception circuit can receive a double pulse. However, since the synchronous system requires transmission and reception of a timing clock, the synchronous reception circuit requires additional wiring of the interposer and an additional transmitter/receiver and is accordingly expensive. In addition, the circuit is less usable because it requires timing adjustment of the clock. There are no documents that disclose the concept of providing an interposer using asynchronous transmission/reception system, which is free from these problems.

Non-Patent Literature 11 points out the following problems with reference to FIGS. 6.7 and 6.10 in the chapter 6.2 Future Work.

The first transformer has a band-pass characteristic; it differentiates NRZ signals into RZ pulses. (Snip) The second transformer has the same band-pass characteristic as the first one; it differentiates the pulses and creates double pulses. For instance, simulated eye-diagrams for the single pulse at the end of T-line and the double pulses at the input of RX are shows in FIG. 6.10. Due to the double pulses, the RX circuit cannot recover the NRZ signals. Limiting or avoiding double pulses is one of the major design challenges in a LCI system with two transformers.

In short, Non-Patent Literature 11 states that, if two coils are coupled to each other, the input waveform is subjected to second-order differentiation, and a Non-Return-to-Zero signal transmitted from the transmitter is output to the receiver in the form of a double pulse, which cannot be received by a conventional receiver.

The conventional asynchronous receiver maintains high reception sensitivity to be always able to receive a signal and therefore suffers from high probability of malfunction due to noise. To solve the problem, the asynchronous receiver is formed by using a hysteresis comparator so that the reception signal Rx data is inverted when the reception pulse signal $V_R$ is higher than a predetermined threshold and is not inverted when the noise is equal to or lower than the threshold. The input threshold varies with the data output from the hysteresis comparator.

When the hysteresis comparator is used, if LOW is initially output as the reception signal Rx data, the input threshold is $+V_{th}$ higher. When a positive pulse is input and exceeds the input threshold, the reception signal Rx data is inverted to HIGH, and the input threshold becomes $-V_{th}$ lower. The reception signal Rx data is kept HIGH until the next negative pulse voltage exceeding the input threshold is input. The digital data can be properly recovered from the positive and negative pulse voltages by repeating the process described above.

However, the asynchronous receiver described above cannot receive a double-pulse signal. For example, when the asynchronous receiver detects the first half pulse of a double-pulse signal of data that are expected, the receiver also responds to the subsequent second half pulse of the opposite polarity and, therefore, outputs digital data different from the transmission data as the reception data.

Since the next transmission data have polarities opposite to those of the previously transmission data (for example, the next transmission data changes from HIGH to LOW if the previous transmission data changes from LOW to HIGH), the reception data for the next transmission data include double pulses of polarities opposite to those of the previous reception data.

Therefore, the first half pulse is away from the input threshold, and the input threshold changes in the opposite direction to the input signal. It takes a predetermined time for the input threshold having changed in the opposite direction to be restored the original set value, so that the second half pulse, which comes immediately after the first half pulse, cannot be properly received. Therefore, the reception data do not change and differ from the transmission data. As described above, the conventional asynchronous receiver cannot properly receive the double-pulse signal.

Solution to Problem

An object of the present invention is to enable data communication between a pair of coils that are formed by a wire on chips stacked on one another and that cannot communicate with each other because of inadequate inductive coupling therebetween due to misalignment of the central axes thereof by reconstructing the desired inductive coupling between the coils by inserting an interposer (a rewiring layer), which has coils connected by wire to each other, between the chips and using an electronic circuit provided with an asynchronous receiver capable of properly receiving a signal, thereby providing inductive couplings between the coils on the interposer and the coils on the chips.

An electronic circuit according to the present invention comprises:

a first substrate having a first coil that is formed by a wire and transmits a signal and a first transmission circuit that is connected to the first coil and asynchronously outputs the signal to the first coil;

a second substrate having a second coil that is formed by a wire at a position corresponding to the first coil and forms a communication channel with the first coil to receive the signal and a third coil that is connected to the second coil by a wire on the substrate and transmits the signal; and a third substrate having a fourth coil that is formed by a wire at a position corresponding to the third coil and forms a communication channel with the third coil to receive the signal and a first reception circuit that is connected to the fourth coil and asynchronously receives the signal from the fourth coil, the first substrate, the second substrate and the third substrate being stacked on one another, and the first transmission circuit changes a current to be flowed to the first coil each time a logical value of transmission data changes.

In this case, the first reception circuit may extract a single-pulse signal from the received signal by comparing the received signal that comprises a plurality of pulses that are combined together with a threshold and generate the transmission data from the single-pulse signal.

In any of the cases described above, the second substrate may have a resistor disposed between the second coil and the third coil.

An electronic circuit according to another aspect of the present invention comprises:

a first substrate having a first coil that is formed by a wire and transmits a signal, a second coil that is formed by a wire and receives the signal, a first transmission circuit that is connected to the first coil and outputs the signal to the first coil and a first reception circuit that is connected to the second coil and receives the signal from the second coil;

a second substrate having a third coil that is formed by a wire on a first surface of the second substrate closer to the first substrate at a position corresponding to the first coil and forms a communication channel with the first coil to receive the signal, a fourth coil that is formed by a wire on the first surface at a position corresponding to the second coil and forms a communication channel with the second coil to transmit the signal, a fifth coil that is formed by a wire on a second surface of the second substrate opposite to the first surface and connected to the third coil via a through hole and transmits the signal, and a sixth coil that is formed by a wire on the second surface and connected to the fourth coil via the through hole and receives the signal; and a third substrate having a seventh coil that is formed by a wire at a position corresponding to the fifth coil and forms a communication channel with the fifth coil to receive the signal, a second reception circuit that is connected to the seventh coil and receives the signal from the seventh coil, an eighth coil that is formed at a position corresponding to the sixth coil and forms a communication channel with the sixth coil to transmit the signal, and a second transmission circuit that is connected to the eighth coil and outputs the signal to the eighth coil, the second substrate being stacked on the first substrate, and the third substrate being stacked on the second substrate, and the distance between the first surface and the second surface of the second substrate is larger than the largest diameter from among the diameters of the third coil, the fourth coil, the fifth coil and the sixth coil to sufficiently reduce the inductive coupling between the third coil or fourth coil and the sixth coil or fifth coil.

An electronic circuit according to another aspect of the present invention comprises:

a first substrate having a first coil that is formed by a wire and transmits a signal, a second coil that is formed by a wire and receives the signal, a first transmission circuit that is connected to the first coil and outputs the signal to the first coil and a first reception circuit that is connected to the second coil and receives the signal from the second coil;

a second substrate having a third coil that is formed by a wire on a first surface of the second substrate closer to the first substrate at a position corresponding to the first coil and forms a communication channel with the first coil to receive the signal, a fourth coil that is formed by a wire on the first surface at a position corresponding to the second coil and forms a communication channel with the second coil to transmit the signal, a fifth coil that is formed by a wire on a second surface of the second substrate opposite to the first surface and connected to the third coil via a through hole and transmits the signal, and a sixth coil that is formed by a wire on the second surface and connected to the fourth coil via the through hole and receives the signal; and a third substrate having a seventh coil that is formed by a wire at a position corresponding to the fifth coil and forms a communication channel with the fifth coil to receive the signal, a second reception circuit that is connected to the seventh coil and receives the signal from the seventh coil, and eighth coil that is formed at a position corresponding to the sixth coil and forms a communication channel with the sixth coil to transmit the signal, and a second transmission circuit that is connected to the eighth coil and outputs the signal to the eighth coil, the second substrate being stacked on the first substrate, and the third substrate being stacked on the second substrate, and the electronic circuit further comprises a shield film for attenuating a magnetic field that is disposed between the third coil or fourth coil and the sixth coil or fifth coil.

An electronic circuit according to another aspect of the present invention comprises:

a first substrate having a first coil that is formed by a wire and transmits and receives a signal and a first transmission/reception circuit that is connected to the first coil and asynchronously receives and outputs the signal from and to the first coil;

a second substrate having a second coil that is formed by a wire at a position corresponding to the first coil and forms a communication channel with the first coil to transmit and receive the signal and a third coil that is connected to the second coil by a wire on the substrate and transmits and receives the signal; and a third substrate having a fourth coil that is formed by a wire at a position corresponding to the third coil and forms a communication channel with the third coil to transmit and receive the signal and a second transmission/reception circuit that is connected to the fourth coil and asynchronously receives and outputs the signal from and to the fourth coil, the first substrate, the second substrate and the third substrate being stacked on one another, and the first transmission/reception circuit may change a current that is to be made to flow to the first coil each time a logical value of transmission data changes.

In this case, the second transmission/reception circuit may extract a single-pulse signal from the received signal by comparing the received signal that comprises a plurality of pulses that are combined together with a threshold and generate the transmission data from the single-pulse signal.

In any of the cases described above, the second substrate may have a resistor disposed between the second coil and the third coil.

An electronic circuit according to another aspect of the present invention comprises:

a first substrate having a first coil and a second coil that are formed by a wire and transmit and receive a signal, a first transmission/reception circuit that is connected to the first coil and receives and outputs the signal from and to the first coil and a second transmission/reception circuit that is connected to the second coil and receives and outputs the signal from and to the second coil;

a second substrate having a third coil that is formed by a wire on a first surface of the second substrate closer to the first substrate at a position corresponding to the first coil and forms a communication channel with the first coil to transmit and receive the signal, a fourth coil that is formed by a wire on the first surface at a position corresponding to the second coil and forms a communication channel with the second coil to transmit and receive the signal, a fifth coil that is formed by a wire on a second surface of the second substrate opposite to the first surface and connected to the third coil via a through hole and transmits and receives the signal, and a sixth coil that is formed by a wire on the second surface and connected to the fourth coil via the through hole and transmits and receives the signal; and a third substrate having a seventh coil that is formed by a wire at a position corresponding to the fifth coil and forms a communication channel with the fifth coil to transmit and receive the signal, a third transmission/reception circuit that is connected to the seventh coil and receives and outputs the signal from and to the seventh coil, an eighth coil that is formed at a position corresponding to the sixth coil and forms a communication channel with the sixth coil to transmit and receive the signal, and a fourth transmission/reception circuit that is connected to the eighth coil and receives and outputs the signal from and to the eighth coil, the second substrate being stacked on the first substrate, and the third substrate being stacked on the second substrate, and the distance between the first surface and the second surface of the second substrate is larger than the largest diameter from among the diameters of the third coil, the fourth coil, the fifth coil and the sixth coil to sufficiently reduce the inductive coupling between the third coil or fourth coil and the sixth coil or fifth coil.

An electronic circuit according to another aspect of the present invention comprises:

a first substrate having a first coil and a second coil that are formed by a wire and transmit and receive a signal, a first transmission/reception circuit that is connected to the first coil and receives and outputs the signal from and to the first coil and a second transmission/reception circuit that is connected to the second coil and receives and outputs the signal from and to the second coil;

a second substrate having a third coil that is formed by a wire on a first surface of the second substrate closer to the first substrate at a position corresponding to the first coil and forms a communication channel with the first coil to transmit and receive the signal, a fourth coil that is formed by a wire on the first surface at a position corresponding to the second coil and forms a communication channel with the second coil to transmit and receive the signal, a fifth coil that is formed by a wire on a second surface of the second substrate opposite to the first surface and connected to the third coil via a through hole and transmits and receives the signal, and a sixth coil that is formed by a wire on the second surface and connected to the fourth coil via the through hole and transmits and receives the signal; and a third substrate having a seventh coil that is formed by a wire at a position corresponding to the fifth coil and forms a communication channel with the fifth coil to transmit and receive the signal, a third transmission/reception circuit that is connected to the seventh coil and receives and outputs the signal from and to the seventh coil, an eighth coil that is formed at a position corresponding to the sixth coil and forms a communication channel with the sixth coil to transmit and receive the signal, and a fourth transmission/reception circuit that is connected to the eighth coil and receives and outputs the signal from and to the eighth coil, the second substrate being stacked on the first substrate, and the third substrate being stacked on the second substrate, and the electronic circuit further comprises a shield film for attenuating a magnetic field that is disposed between the third coil or fourth coil and the sixth coil or fifth coil.

Advantageous Effects of Invention

According to the present invention configured as described above, the current applied to the first coil is changed each time the logical value of the transmission data changes. As a result, the waveform of the voltage received by the reception circuit via the interposer changes in response to the transmission data. In general, the voltage waveform is a pulse form resulting from differentiation, so that a single-pulse signal can be extracted from the voltage waveform by threshold comparison, and the transmission data can be reproduced from the single-pulse signal.

As described above, according to the present invention, asynchronous communication can be conducted even when the interposer is used, the positions of the coils can be arbitrarily determined in the electronic circuit that provides asynchronous communication using inductive coupling between the coils formed on substrates. Thus, the coils can be arranged at optimal positions for the substrates (chips) or the manufactures and vendors, so that the cost of the substrates (chips) can be reduced. In addition, since asynchronous communication can be provided, timing adjustment, which is necessary in synchronous communication, is not necessary.

In addition, no synchronizing signal is required, the traffic for transmission decreases, and the power required for communication can be reduced.

If the resistor is disposed between the coils forming the interposer, the transmitted waveform can be adjusted, and signal communication can be properly provided even if the distance between the rewired coils is short. Thus, there is no need to redesign the transmission/reception circuit according to the distance.

If the thickness of the interposer is adjusted, the effect of unwanted inductive coupling can be suppressed.

If the shield film is provided, the thickness of the interposer can be reduced.

BRIEF DESCRIPTION OF DRAWINGS

FIG. 8 are diagrams for illustrating embodiment 4 of the present invention, in which FIG. 8(a) shows an approximate equivalent circuit of an interposer and a theoretical formula of a transimpedance thereof, and FIG. 8(b) is a graph showing a calculation result of the transimpedance with respect to frequency.

FIG. 9 is a circuit diagram showing a configuration of the interposer according to the embodiment 4.

FIG. 21 includes diagrams for illustrating a configuration of a second substrate (interposer) shown in FIG. 20.

DESCRIPTION OF EMBODIMENTS

In the following, preferred embodiments of the present invention will be described in detail with reference to the accompanying drawings.

Embodiment 1

Figure 1:
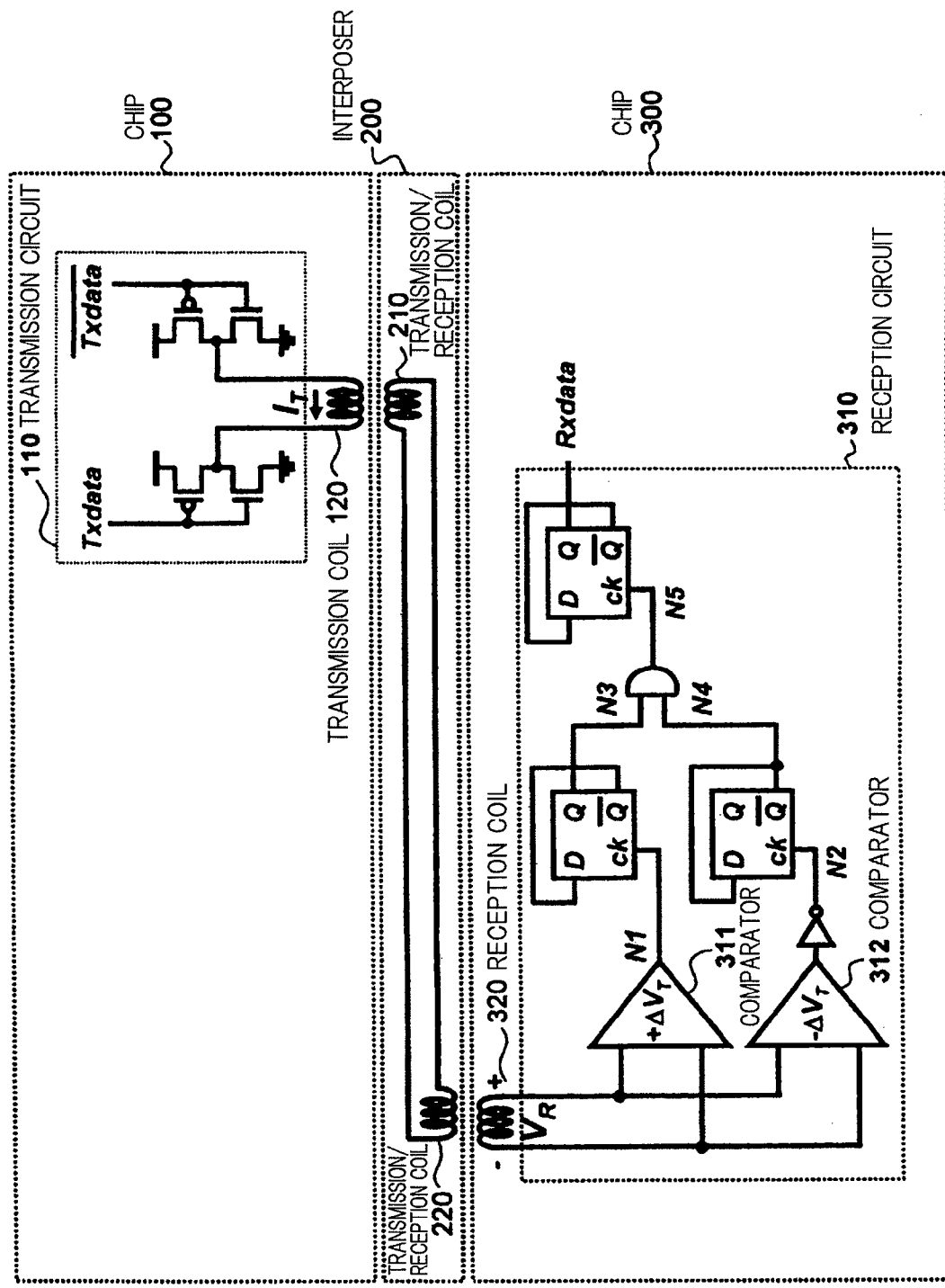
FIG. 1 is a diagram showing a configuration of essential parts of an embodiment 1 of the present invention.
Figure 2:
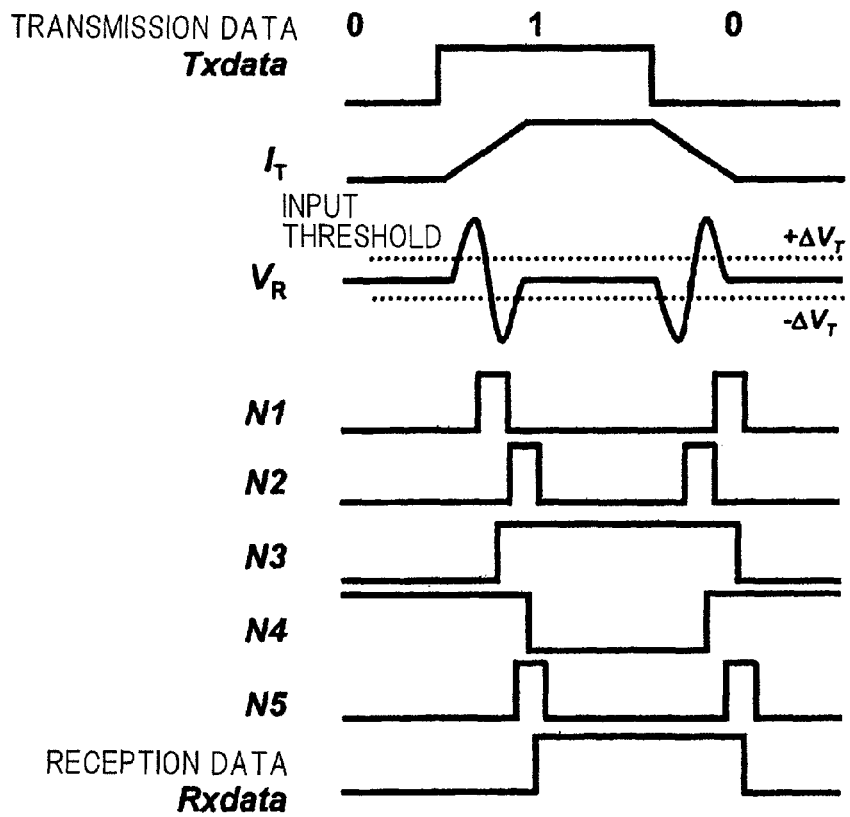
FIG. 2 is a diagram showing waveforms involved with an operation of embodiment 1.

FIG. 1 is a diagram showing a configuration of essential parts of embodiment 1 of the present invention, and FIG. 2 is a diagram showing waveforms involved with an operation of embodiment 1.

This embodiment comprises chip 100, interposer 200, and chip 300.

Transmission circuit 110 and transmission coil 120 are mounted on chip 100. Reception circuit 310 and reception coil 320 are mounted on chip 300. Transmission/reception coils 210 and 220, which are inductively coupled with transmission coil 120 and reception coil 320, respectively, are mounted on interposer 200.

In addition, a component (not shown) that functions as a memory or other kinds of devices is mounted on chips 100 and 300.

Transmission circuit 110 is formed by the transmission circuit described in Non-Patent Literature 8. As shown in FIG. 2, a positive or negative current $I_T$ is applied to transmission coil 120 according to transmission data Tx data.

The current $I_T$ induces a current in transmission/reception coils 210 and 220, thereby inducing a double-pulse voltage signal $V_R$ having a waveform that is a second-order derivative of the current $I_T$ in reception coil 320.

Typically, the double-pulse voltage signal $V_R$ has a peak-to-peak amplitude of 200 mV and a duration of 100 psec. Comparators 311 and 312 in reception circuit 310, which are differential input comparators, detect the voltage signal $V_R$.

Comparator 311 has an input threshold offset of $\Delta V_T$, and comparator 312 has an input threshold offset of $-\Delta V_T$. That is, comparator 311 outputs HIGH when a voltage of $\Delta V_T$ or higher is input to an input thereof and outputs LOW when a voltage or $\Delta V_T$ or lower is input to the input thereof.

On the other hand, comparator 312 outputs HIGH when a voltage of $-\Delta V_T$ or higher is input to an input thereof and outputs LOW when a voltage of $-\Delta V_T$ or lower is input to the input thereof.

A typical value of $\Delta V_T$ is 30 mV. Methods of designing the comparator having an offset of $\Delta V_T$ are widely known. For example, the offset of $\Delta V_T$ can be achieved by designing a differential-input transistor pair in which the transistors have different channel widths or in which a resistor is inserted at the source of one of the transistors.

Two peaks of the double-pulse voltage signal are detected with two comparators 311 and 312 to generate a pulse signal. An output (N1) of comparator 311 and an inverted output (N2) of comparator 312 are input to respective frequency divider circuits formed by a flip-flop, which provide outputs (N3 and N4) that are inverted at each rising edge. An AND circuit calculates a logical product (N5) of the outputs from the flip-flops, and another flip-flop performs frequency division of the resulting waveform to reproduce reception data Rx data, which is the same as the transmission data Tx data.

Figure 3:
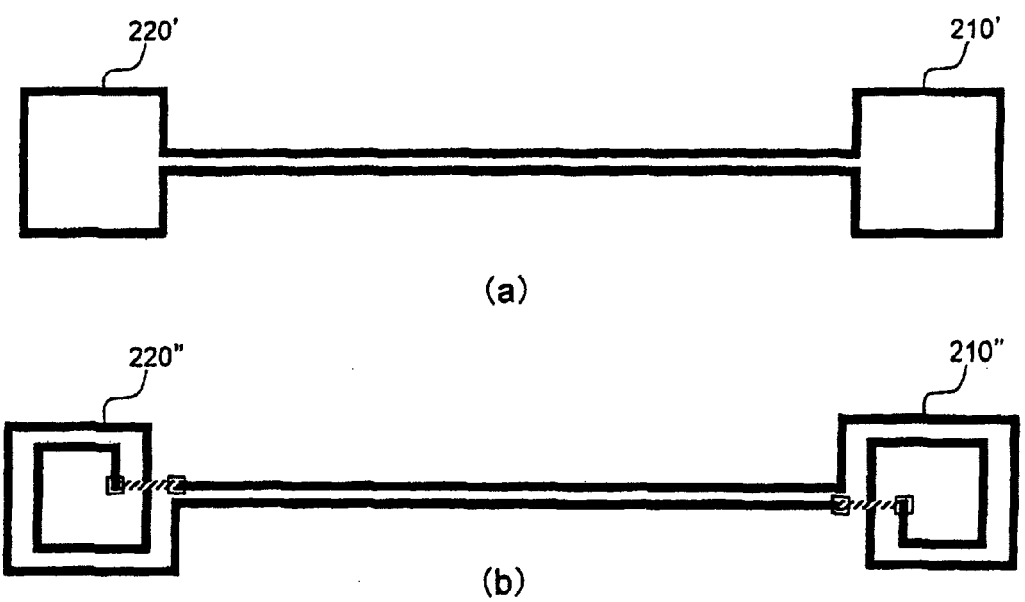
FIGS. 3(a) and 3(b) show examples of the layout of interposer 200 shown in FIG. 1.

FIG. 3 shows examples of the layout of interposer 200.

In the example shown in FIG. 3(a), transmission/reception coils 210' and 220' are one-turn coils formed in a single wiring layer and coupled to each other. Typically, each coil has a diameter of 200 μm, a line width of 10 μm and a line interval of 5 μm. Since the interposer comprises a single wiring layer, the interposer has an advantage that the manufacturing cost can be reduced.

In the example shown in FIG. 3(b), transmission/reception coils 210" and 220" having an increased number of turns are formed using a plurality of wiring layers and an interconnection via. The interposer thus configured has an advantage that the transmission/reception power can be reduced, because the inductance of each coil can be increased to enhance the reception signal.

The interposer may be formed on a substrate made of an organic material, such as epoxy resin, or a silicon substrate. The organic material has an advantage that the manufacturing cost can be reduced, and the silicon substrate has an advantage that the work dimension can be reduced.

If the pulse duration is 100 psec, and the pulse interval is 100 psec, data communication can be achieved at 5 Gbps.

In the embodiment configured as described above, the double-pulse input signal is compared with a threshold to extract a single-pulse signal, and transmission data is produced from the single-pulse signal.

Embodiment 2

Figure 4:
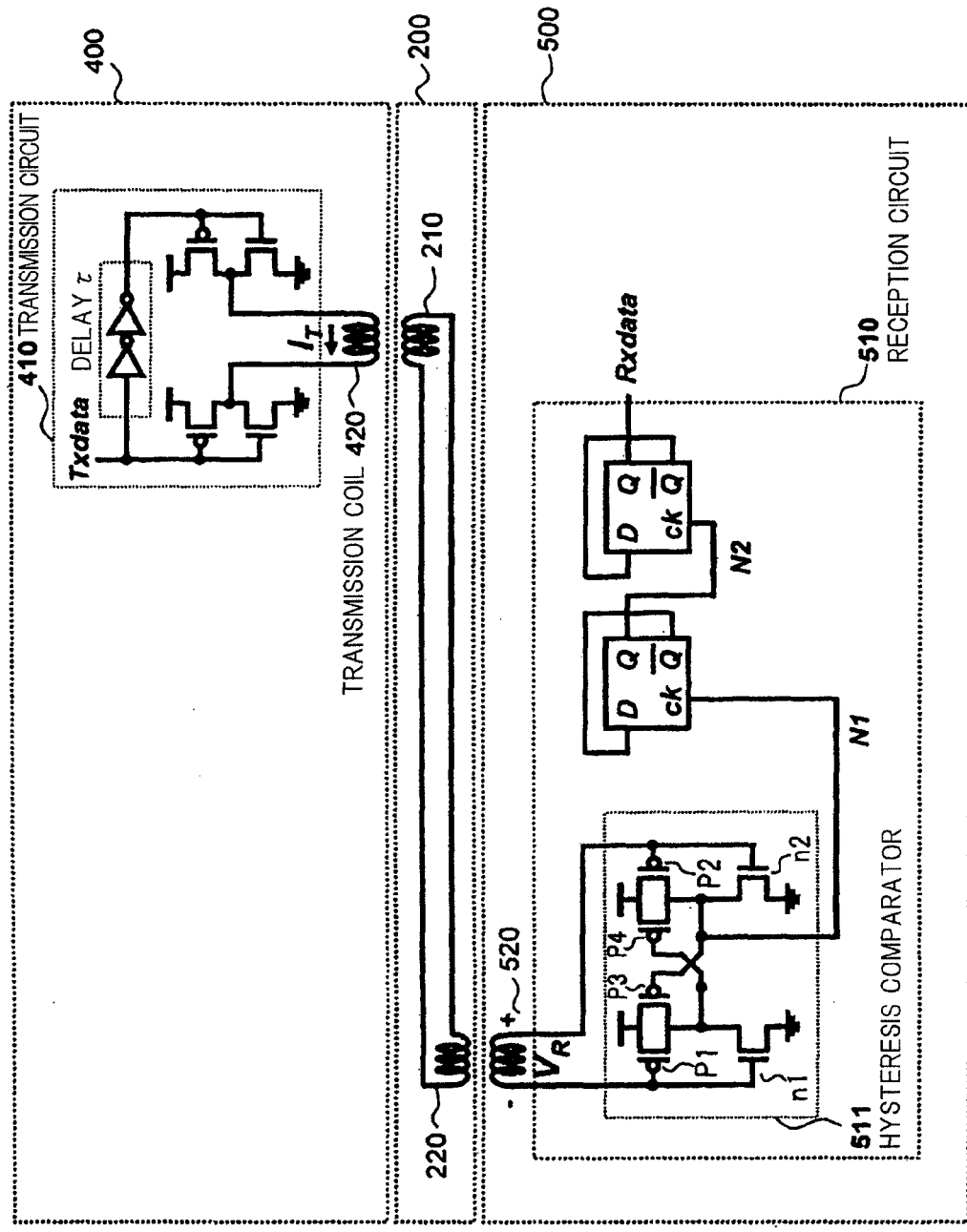
FIG. 4 is a diagram showing a configuration of essential parts of embodiment 2 of the present invention.
Figure 5:
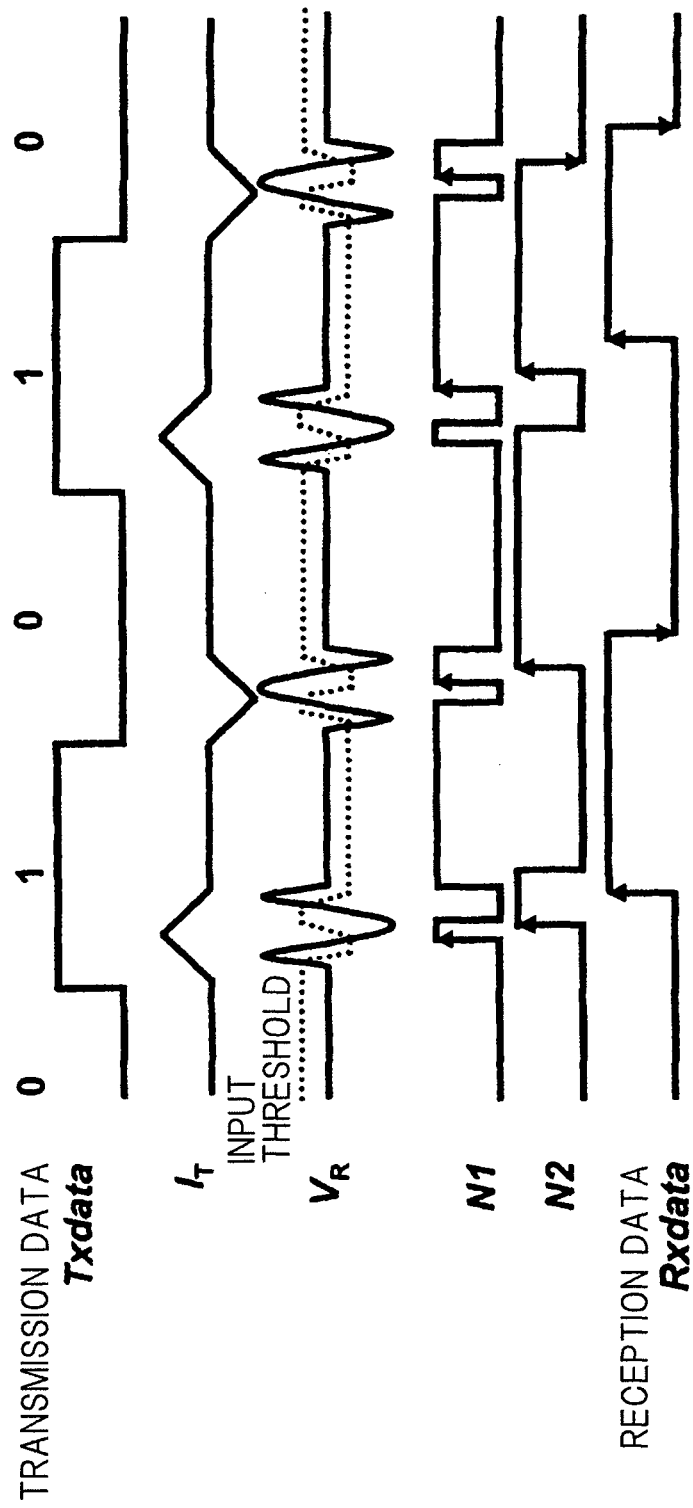
FIG. 5 is a diagram showing waveforms involved with an operation of embodiment 2.

FIG. 4 is a diagram showing a configuration of essential parts of an embodiment 2 of the present invention, and FIG. 5 is a diagram showing waveforms involved with an operation of the embodiment 2.

In the embodiment 1, a direct current continuously flows through the transmission coil. However, in this embodiment, a pulse current is applied to the transmission coil in order to reduce transmission power consumption.

This embodiment comprises chip 400, interposer 200 having the same configuration as that in embodiment 1, and chip 500.

Transmission circuit 410 and transmission coil 420 are mounted on chip 400. Reception circuit 510 and reception coil 520 are mounted on chip 500.

In addition, a component (not shown) that functions as a memory or other devices is mounted on chips 400 and 500.

Transmission circuit 410 is formed by the transmission circuit described in Patent Literature 1. Transmission data Tx data is applied to a pair of inverters connected to the opposite ends of transmission coil 420 with a delay τ provided between the inverters by a plurality of inverter circuits, and thus, current flows through transmission coil 420 for the delay time τ if the application causes a change in the transmission data Tx data. The driving power for the pair of inverters is set so that the current flowing through transmission coil 420 has a triangular waveform.

As shown in FIG. 5, transmission circuit 410 applies a positive or negative current $I_T$ having a triangular waveform to transmission coil 420 according to transmission data Tx data.

The current $I_T$ induces a current in transmission/reception coils 210 and 220, thereby inducing a triple-pulse voltage signal $V_R$ having a waveform that is a second-order derivative of the current $I_T$ in reception coil 520.

Typically, the triple-pulse voltage signal $V_R$ has a peak-to-peak amplitude of 200 mV and a duration of 100 psec. In this embodiment, the delay time τ of transmission circuit 410 is set at 100 psec.

The voltage signal $V_R$ is input to hysteresis comparator 511 in reception circuit 510. Hysteresis comparator 511 is the differential input comparator described in Non-Patent Literature 8.

Hysteresis comparator 511 comprises an amplifier circuit comprising a CMOS inverter comprising a pMOS transistor P1 and an nMOS transistor N1 and a CMOS inverter comprising a pMOS transistor P2 and an nMOS transistor N2 and a latch circuit formed by cross-coupling the gates of a pMOS transistor P3 connected in parallel with the pMOS transistor P1 and a pMOS transistor P4 connected in parallel with the pMOS transistor P2 to output terminals of the CMOS inverters, for example.

The latch circuit changes the threshold voltage of the inverters according to data held therein. For example, when the latch circuit latches a low-level signal, the output is not inverted unless an inverted input having a greater absolute value than the logical threshold voltage of the CMOS inverters occurs, because of the current supply action of the pMOS transistor P3, and the apparent threshold voltage of hysteresis comparator 511 increases.

Once the latched data is inverted, the output is not inverted unless an inverted input having a greater absolute value than the logical threshold voltage of the CMOS inverters occurs, because of the current supply action of the pMOS transistor P4, and the apparent threshold voltage of hysteresis comparator 511 decreases.

In this way, hysteresis comparator 511 changes the input threshold voltage each time the logical value of the output signal is inverted. As shown in FIG. 5, hysteresis comparator 511 outputs a pulse signal N1 that changes the potential each time the voltage signal $V_R$ changes. The dashed line shown along with the waveform of voltage signal $V_R$ indicates the threshold voltage of hysteresis comparator 511. The duration of the pulse signal N1 is approximately 0.5τ.

If the pulse signal N1 is input to a frequency divider circuit formed by a flip-flop, the frequency divider circuit provides an output N2 that is inverted at each rising edge. Reception data Rx data that is the same as the transmission data Tx data can be reproduced by performing frequency division of the output N2 with a flip-flop again.

As shown in FIG. 5, the periods of the HIGH level of the reception data Rx data differ from the periods of the HIGH level of the transmission data Tx data. This is because each period of the HIGH level of the reception data Rx data is triggered by a different pulse in the triple-pulse signal, for example, the first pulse or the third pulse. Provided that the duration of the triple-pulse signal is 100 psec, the interval between the first pulse and the third pulse is 75 psec. Therefore, in data communication at 5 Gbps, the period of the HIGH level of the reception data Rx data may be 200 psec or 125 psec.

Embodiment 3

Figure 6:
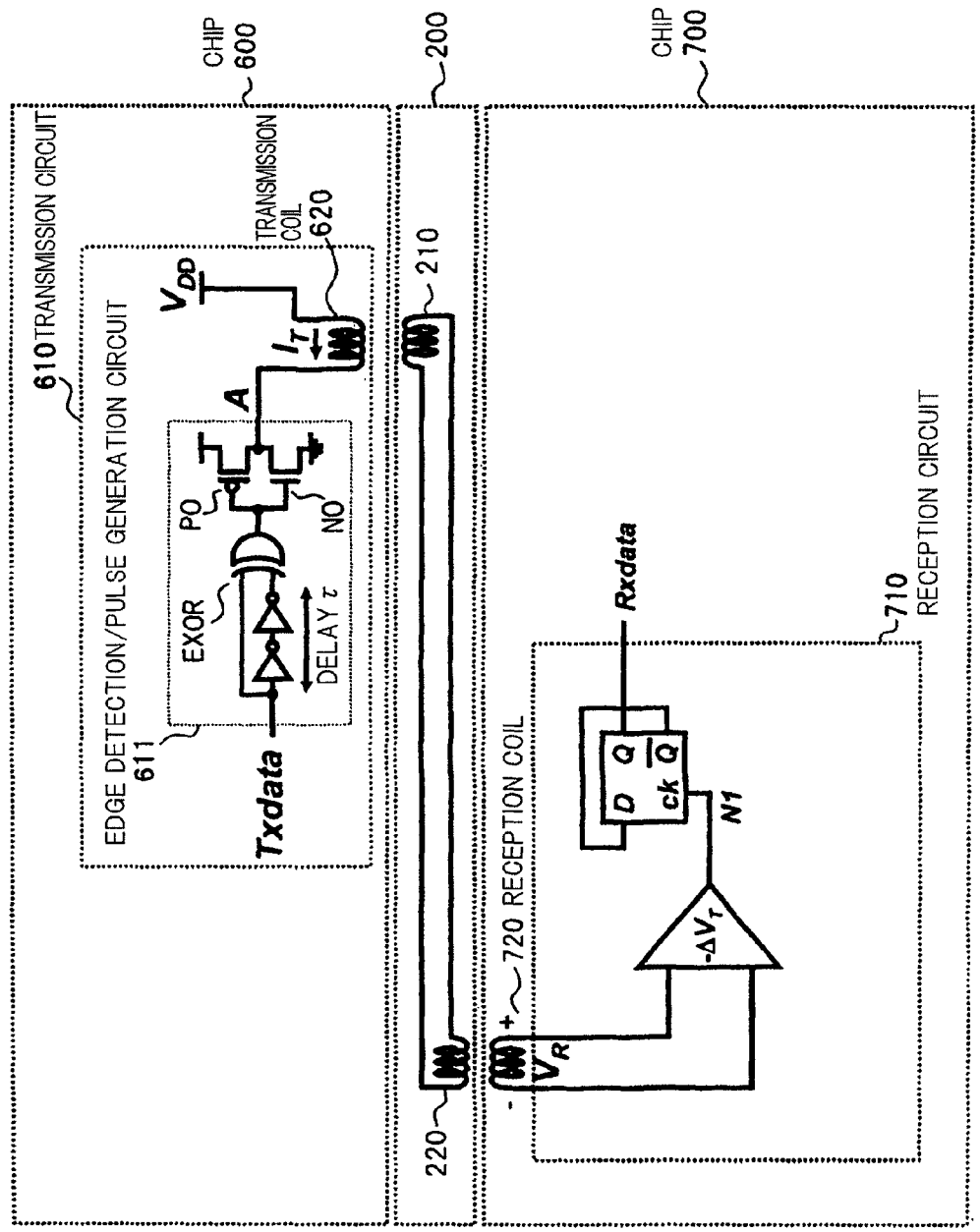
FIG. 6 is a diagram showing a configuration of essential parts of embodiment 3 of the present invention.
Figure 7:
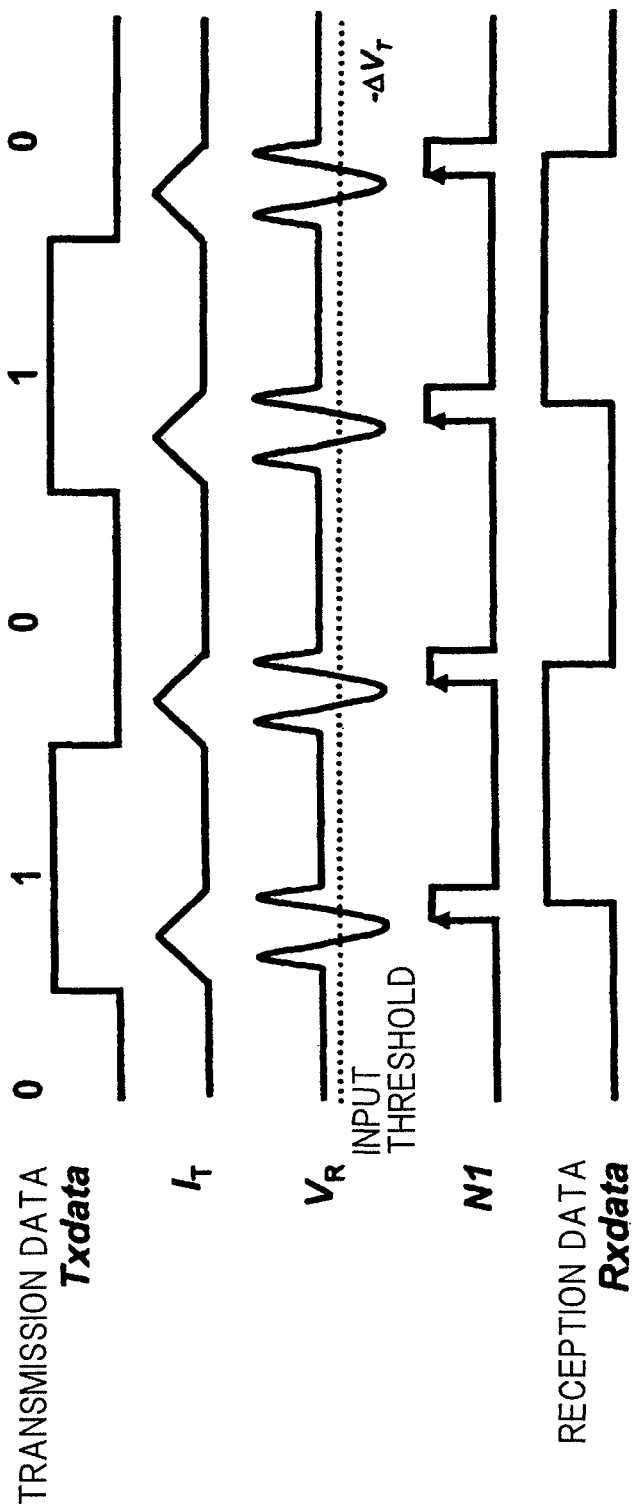
FIG. 7 is a diagram showing waveforms involved with an operation of embodiment 3.

FIG. 6 is a diagram showing a configuration of essential parts of embodiment 3 of the present invention, and FIG. 7 is a diagram showing waveforms involved with an operation of embodiment 3.

The difference in the period of the HIGH level between the waveform of the reception data Rx data and the waveform of the transmission data Tx data in the embodiment 2 may pose a problem. This embodiment is intended to solve the problem.

This embodiment comprises chip 600, interposer 200 having the same configuration as that in embodiment 1, and chip 700.

Transmission circuit 610 and transmission coil 620 are mounted on chip 600. Reception circuit 710 and reception coil 720 are mounted on chip 700.

In addition, a component (not shown) that functions as memory or other kinds of devices is mounted on chips 600 and 700.

Transmission circuit 610 is provided with edge detection/pulse generation circuit 611 that detects a change in transmission data Tx data and generates a pulse. Edge detection/pulse generation circuit 611 is configured to calculate XOR of the transmission data Tx data and a delay signal thereof and drive the potential at one end of transmission coil 620 by means of a CMOS inverter formed by a pMOS transistor P0 and an nMOS transistor N0 with the XOR signal to draw current from the other end of transmission coil 620, for example.

As described above, transmission circuit 610 transmits data by applying a single-pulse current having a single polarity to transmission coil 620 when transmission data Tx data changes from 0 to 1 or from 1 to 0. Thus, transmission circuit 610 transmits data without regard to whether the transmission data changes from 0 to 1 or from 1 to 0.

Transmission circuit 610 does not transmit polarity information about the transmission data Tx data. More specifically, transmission circuit 610 inputs transmission data Tx data to two inputs of the two-input EXOR gate with a time lag of ti therebetween and outputs a pulse signal having a duration of τ. As a result, the nMOS transistor N0 in the output stage is turned on and causes current $I_T$ to flow the coil for the period of τ and then is turned off. After that, the current $I_T$ continues to flow through transmission coil 620 for a while because of the inductance thereof but eventually decreases to zero.

The output stage of transmission circuit 610 may be formed only by the nMOS transistor. In that case, however, after the nMOS transistor is turned off, the potential of or current in transmission coil 620 may resonate because of the inductance and parasitic capacitance of transmission coil 620 and hinder transmission and reception. In this embodiment, the output stage is formed by the inverter circuit including the pMOS transistor in addition to the nMOS transistor, and the pMOS transistor PO is turned on when the nMOS transistor NO is turned off, so that no resonance occurs. The channel width of the pMOS transistor P0 can be small enough to prevent the coil from resonating.

As described above, transmission circuit 610 applies the pulse current $I_T$ of positive polarity to transmission coil 620 when the transmission data Tx data changes from LOW to HIGH or from HIGH to LOW as shown in FIG. 7. This embodiment differs from embodiment 2 in that the polarity of the pulse current $I_T$ does not alternate between positive and negative but is always positive. Consequently, the polarity of the triple-pulse reception signal $V_R$ is always the same and is not inverted.

The current $I_T$ induces a current in transmission/reception coils 210 and 220, thereby inducing the triple-pulse voltage signal $V_R$ having a waveform that is a second-order derivative of the current $I_T$ in reception coil 720.

Reception circuit 710 comprises a differential input comparator having an input threshold offset of $-\Delta V_T$ and a flip-flop that performs frequency division of the output N1 of the differential input comparator and can produce reception data having the same waveform and HIGH periods as the transmission data Tx data. However, the reception signal Rx data shows only that the transmission data Tx data has been inverted. Thus, the first transmission data after reset can be prescribed to be 0 or 1 in advance.

Embodiment 4

FIG. 8 are diagrams for illustrating embodiment 4 of the present invention. FIG. 8(*a*) shows an approximate equivalent circuit of an interposer and a theoretical formula of a transimpedance thereof, and FIG. 8(*b*) is a graph showing a calculation result of the transimpedance with respect to frequency. FIG. 9 is a circuit diagram showing a configuration of the interposer according to this embodiment.

In embodiments 1 to 3, an interposer comprising two coils coupled to each other is used for transmission, so that a second-order derivative of the input waveform is output. As a result, in embodiment 1, the receiver outputs a double-pulse signal when the receiver receives an NRZ signal from the transmitter. In embodiments 2 and 3, the receiver outputs a triple-pulse signal when the receiver receives a pulse signal from the transmitter.

However, depending on the settings of the electrical parameter of the interposer, the reception waveform can be a first-order derivative of the input waveform.

FIG. 8 show an approximate equivalent circuit of the interposer, a theoretical formula of a transimpedance of the interposer, and a graph of a calculation result of the transimpedance. As can be seen from the drawings, provided that a characteristic frequency $f_1$ of the interposer is expressed by $$f_1 = \frac{R}{2\pi(L_1 + L_2)},$$ [expression 1]

the reception voltage can be expressed by a second-order derivative of the transmission current in a region where the frequency is lower than the characteristic frequency $f_1$ and can be expressed by a first-order derivative of the transmission current in a region where the frequency is higher than the characteristic frequency $f_1$ and lower than a resonance frequency. However, the reception signal starts resonating at a frequency closer to the resonance frequency, so that the signal needs to be damped by inserting a resistor between the opposite ends of the reception coil, for example.

For example, when the interposer shown in FIG. 3(*a*) is used, the total length of the wiring is 3.6 mm if the diameter of the coil is 0.2 mm, and the distance between the coils is 1 mm. Assuming that the wiring has a sheet resistance of 10 mΩ/square, the wiring will have a resistance of about 10Ω if the wiring has a width of 10 μm. Assuming that the inductances L1 and L2 of the coils are equal to 5 nH (L1=L2=5 nH), and the resistance R of the interposer is equal to 10Ω (R=10Ω), the characteristic frequency $f_1$ is 166 MHz. Assuming that the resonance frequency of the interposer is 10 GHz, the reception voltage will have a waveform that is a first-order derivative of the input waveform for any signal having a frequency component between 166 MHz and 1 GHz, despite the use of the interposer.

If it is assumed that the distance between the coils on the interposer is 4 mm, the resistance of the wiring will be about 30Ω, and the characteristic frequency $f_1$ is 500 MHz. That is, the waveform of the reception signal is a first-order derivative of the waveform of the transmission current when the distance between the two coils coupled to each other on the interposer is short and is a second-order derivative of the same when the distance is long.

In embodiments 1 to 3, the reception circuit is configured to be capable of receiving a reception waveform that is the second-order derivative and therefore may malfunction if the distance is short and the reception waveform is the first-order derivative.

Even when the distance is short, the reception waveform can be the second-order derivative if resistor 2002 is inserted in wiring 2001 as shown in FIG. 9. The resistor can be formed by inserting an interconnection via by taking advantage of the parasitic resistance of the interconnection via (one via has a resistance of about 10Ω).

Embodiment 5

Figure 10:
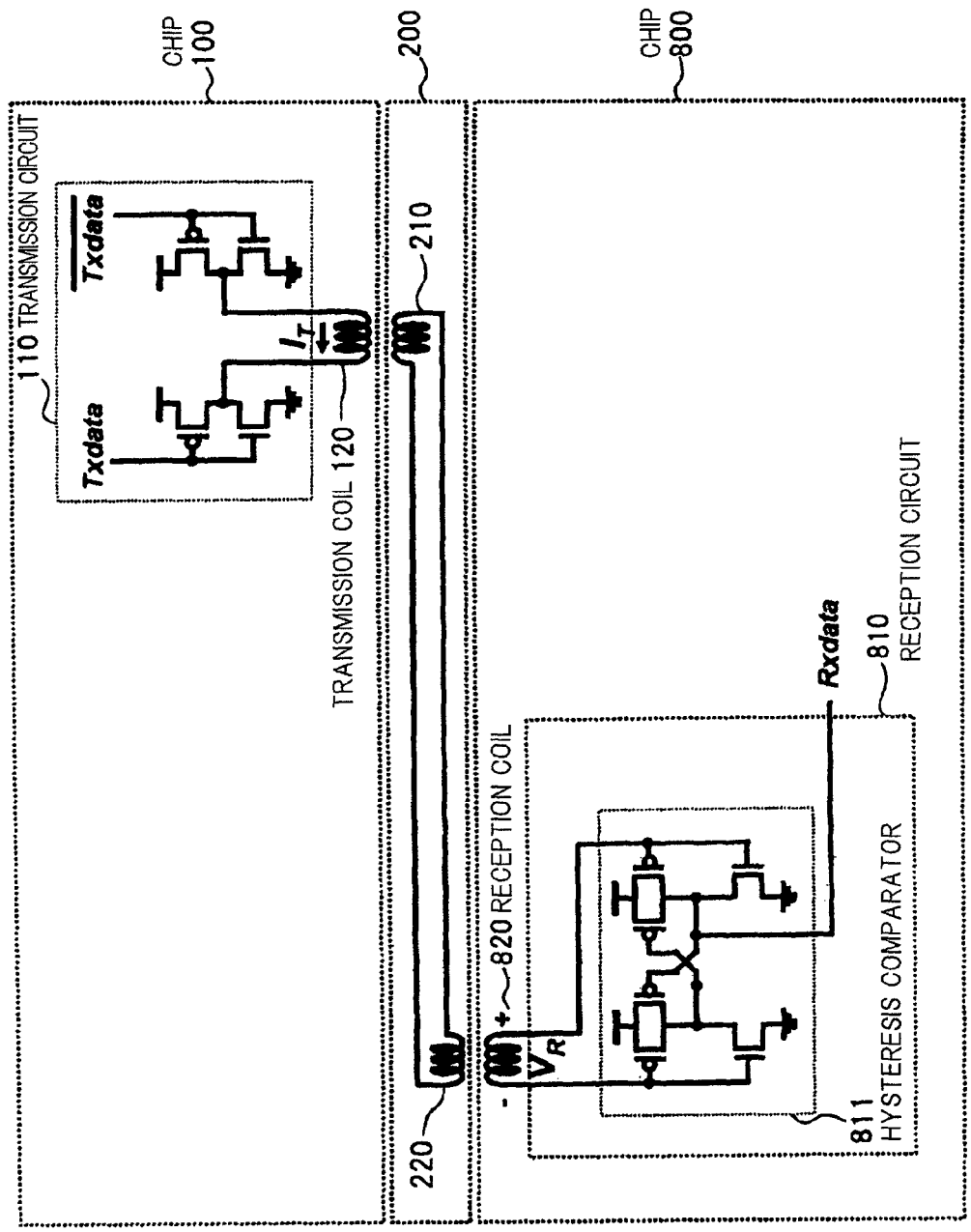
FIG. 10 is a diagram showing a configuration of essential parts of an embodiment 5 of the present invention.
Figure 11:
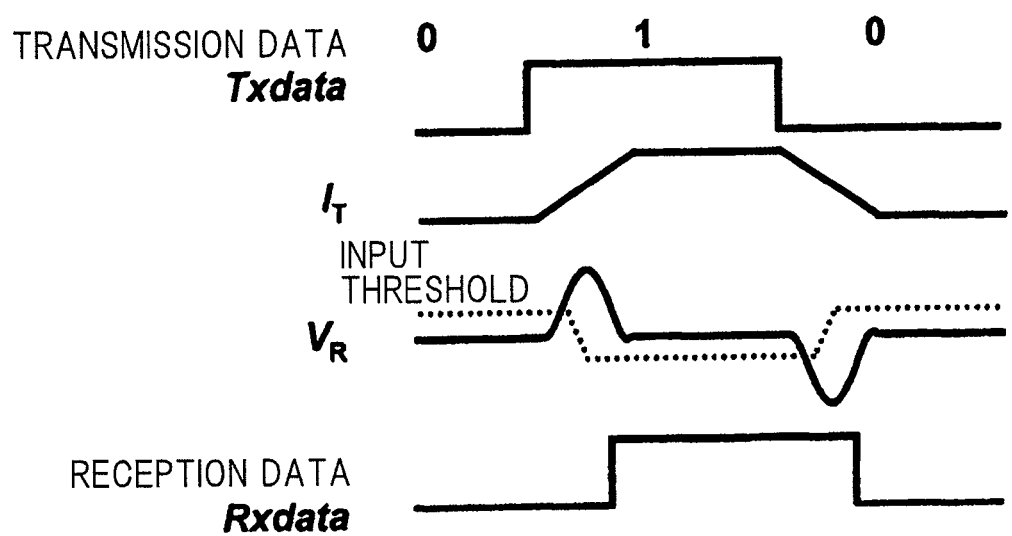
FIG. 11 is a diagram showing waveforms involved with an operation of embodiment 5.

FIG. 10 is a diagram showing a configuration of essential parts of embodiment 5 of the present invention, and FIG. 11 is a diagram showing waveforms involved with an operation of embodiment 5.

This embodiment comprises chip 100 having the same configuration as that in embodiment 1, interposer 200 having the same configuration as that in embodiment 1, and chip 800.

Reception circuit 810, reception coil 820 and a component (not shown) that functions as a memory or other kinds of devices are mounted on chip 800.

In this embodiment, the wiring of interposer 200 is short and has a low resistance. Therefore, when transmission circuit 110 applies a positive or negative current $I_T$ to transmission coil 120 according to the transmission data Tx data, and the current $I_T$ induces a current in transmission/reception coils 210 and 220, the voltage signal $V_R$ induced in reception coil 820 will have a waveform that is a first-order derivative of the current $I_T$.

Reception circuit 810 has hysteresis comparator 811 having the same configuration as hysteresis comparator 511 in the second embodiment shown in FIG. 4 and outputs a pulse signal having a potential that varies with voltage signal $V_R$. Thus, reception data Rx data that is the same as the transmission data Tx data can be reproduced.

Embodiment 6

Figure 12:
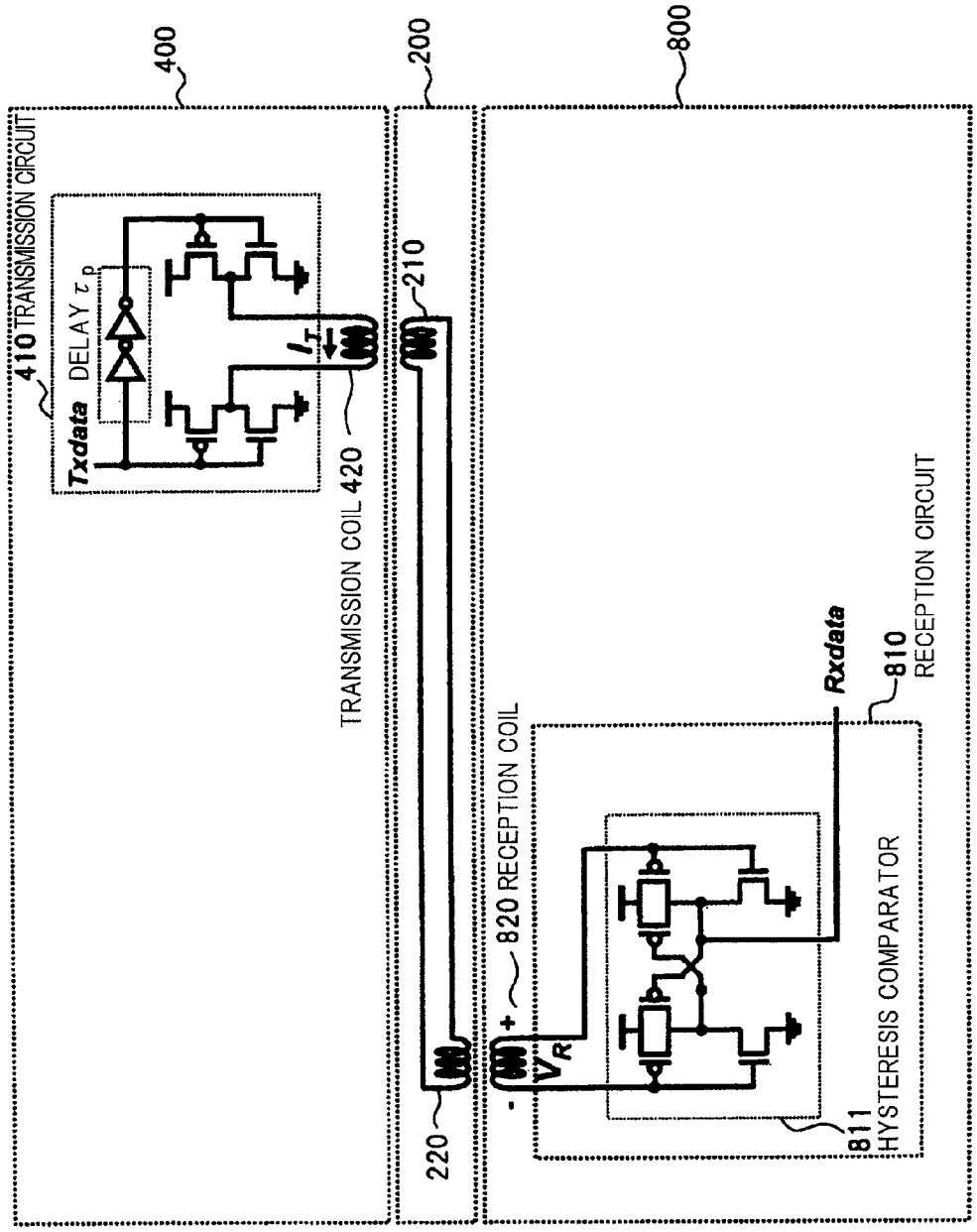
FIG. 12 is a diagram showing a configuration of essential parts of an embodiment 6 of the present invention.
Figure 13:
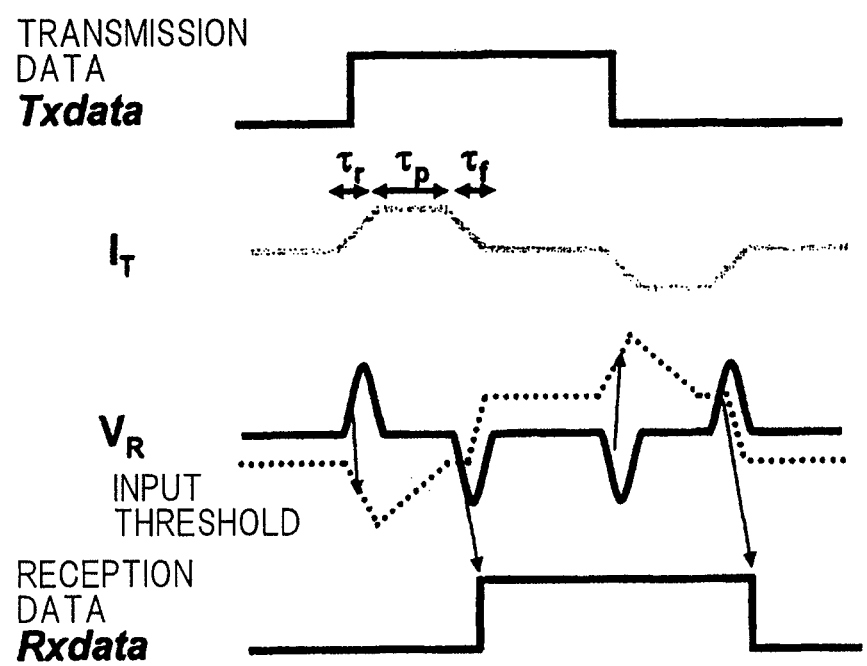
FIG. 13 is a diagram showing waveforms involved with an operation of embodiment 6.

FIG. 12 is a diagram showing a configuration of essential parts of embodiment 6 of the present invention, and FIG. 13 is a diagram showing waveforms involved with an operation of embodiment 6.

This embodiment comprises chip 400 having the same configuration as that in embodiment 2, interposer 200, and chip 800 having the same configuration as that in embodiment 5 shown in FIG. 10.

In the embodiment 2 described above, the power for driving the pair of transistors forming transmission circuit 410 is set so that the current flowing through transmission coil 420 is a triangular wave. However, in this embodiment, the power for driving the pair of transistors is set so that the current is a trapezoidal wave.

In this embodiment also, the wiring of interposer 200 is short and has a low resistance. Therefore, when transmission circuit 410 applies a positive or negative current $I_T$ to transmission coil 420 according to the transmission data Tx data, and current $I_T$ induces a current in transmission/reception coils 210 and 220, the voltage signal $V_R$ induced in reception coil 820 will have a waveform that is a first-order derivative of the current $I_T$.

Transmission circuit 410 has a pair of CMOS inverters that drive the opposite ends of transmission coil 420 in a complementary manner. The transmission data Tx data is supplied to one of the inverters, and a delay signal of the transmission data Tx data is supplied to the other inverter. Transmission circuit 410 applies a pulse current to transmission coil 420 in a direction depending on the logical value of the transmission data for a length of time depending on the delay time tip thereof That is, transmission circuit 410 determines the pulse width of pulse current $I_T$ based on the delay time τp created by a delay element. The pulse current $I_T$ has to have a pulse width that is sufficient for the induced voltage $V_R$ induced in transmission coil 420 according to the rate of change of the pulse current $I_T$ to have the shape of a bipolar single-pulse pair.

Reception circuit 810 in chip 800 has hysteresis comparator 811 that determines voltage signal $V_R$ having the single-pulse shape induced in the reception coil with reference to a threshold voltage and outputs the reception data Rx data as the determination result.

Transmission circuit 410 generates a bipolar single-pulse current $I_T$ by distinguishing between the change of the transmission data from 0 to 1 and the change of the transmission data from 1 to 0 and applies the bipolar single-pulse current $I_T$ to transmission coil 420. The pulse width of the transmission current is determined so that the reception voltage signal is not a double-pulse signal but contains two single pulses that are received at a sufficient interval. For example, as shown in FIG. 13, the voltage signal $V_R$ having the shape of a bipolar single-pulse pair (two single pulses of different polarities) can be produced from one pulse current $I_T$ by providing a time interval of τp between the rising edge and the falling edge of the pulse current $I_T$. Assuming that typical values of τr and τf are 100 ps, a typical value of τp is 300 ps. The value τp is a delay time of the delay signal for the transmission data Tx data and can be determined by increasing or decreasing the number of gates of the inverter shown in the drawing or by changing the channel width of the transistors.

In this embodiment, the bipolar single-pulse pair voltage signal $V_R$ induced in reception coil 820 is formed by a polarity combination of a crest and a trough or a polarity combination of a trough and a crest, and the order of polarities is determined by the polarity of the transmission data. Reception circuit 810 does not detect the first single pulse in the bipolar single-pulse pair voltage signal $V_R$ induced in reception coil 820, and hysteresis comparator 811 can detect and invert the second single-pulse signal to reproduce the reception data. To this end, a threshold voltage is initially set for hysteresis comparator 811. A first and a second method therefore will be disclosed below.

According to the first method, in transmission and reception, the first data is prescribed to be 1 or 0 in advance. For example, if the first data is prescribed to be 0 in advance, the polarities of the double pulses that are to be received will naturally be determined when the first "1" is transmitted and received. Therefore, the threshold of hysteresis comparator 811 is initially set at a logical value that allows reception of the second pulse.

For example, FIG. 13 shows a case where the transmission data assumes a logical value 0 at the leading edge, and the initial value at the output node of hysteresis comparator 811 is a logical value 1, that is, a case where the initial value of the reception data Rx data is a logical value 0.

As the transmission data Tx data varies at the times of rising and falling, the reception data Rx data varies in response to rising and falling of the single-pulse voltage signal $V_R$, and thus, the reception data can be properly reproduced.

According to the second method, the threshold of the hysteresis comparator is not initially properly set, but 2-bit dummy data "01" or "10" is added to the head of the transmission data to perform transmission and reception. In this case, in transmission and reception of the transmission data following the dummy data, the threshold of hysteresis comparator 811 is automatically properly set, and the reception operation can be properly conducted.

Embodiment 7

Figure 14:
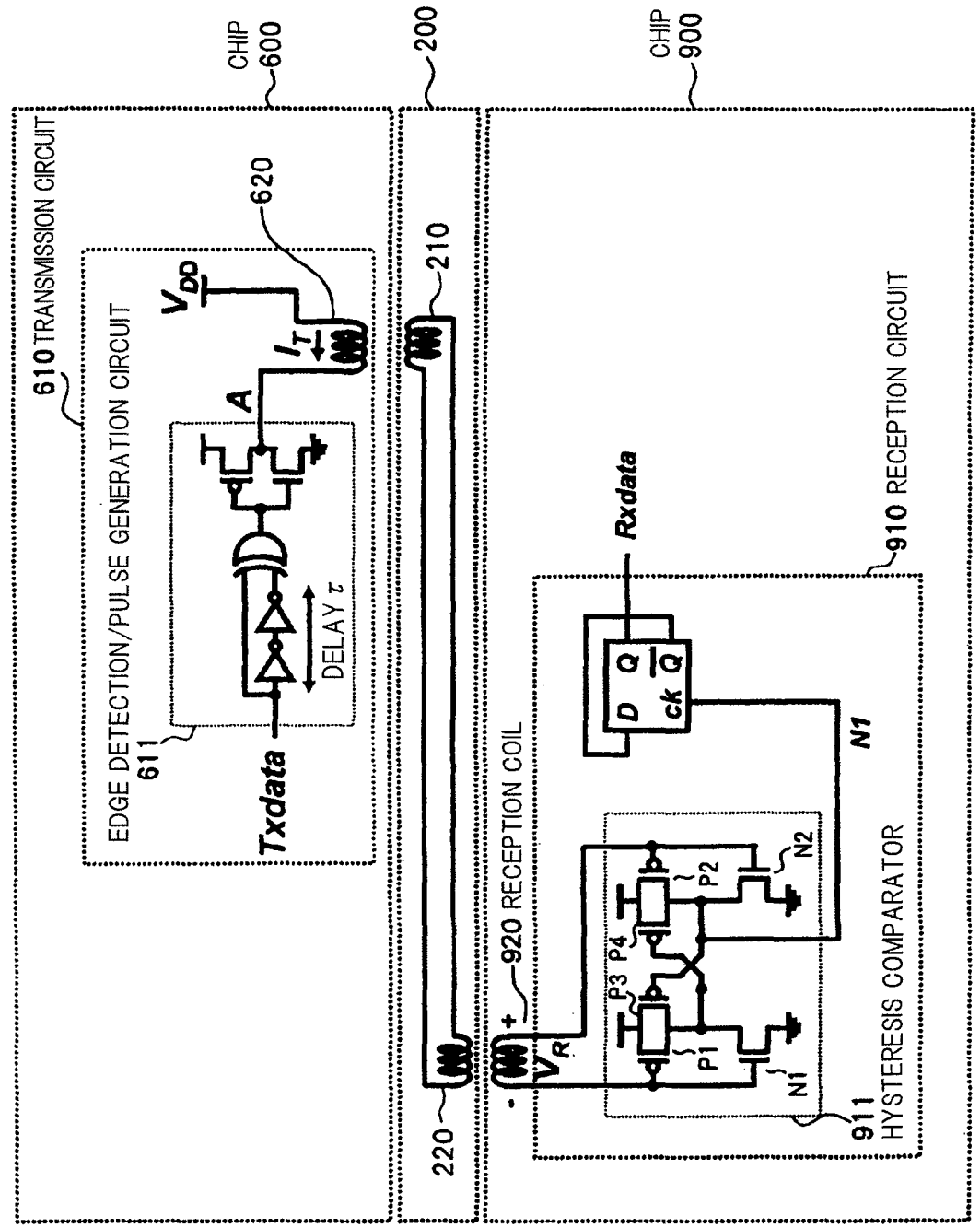
FIG. 14 is a diagram showing a configuration of essential parts of embodiment 7 of present invention.
Figure 15:
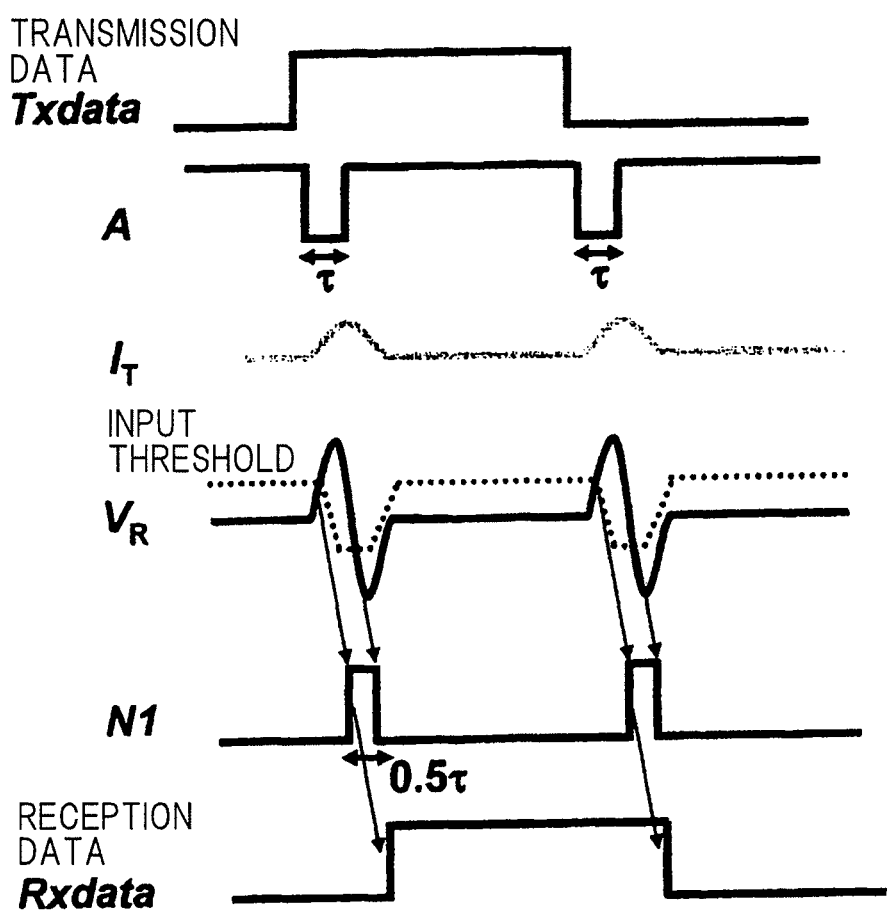
FIG. 15 is a diagram showing waveforms involved with an operation of embodiment 7.

FIG. 14 is a diagram showing a configuration of essential parts of embodiment 7 of the present invention, and FIG. 15 is a diagram showing waveforms involved with an operation of embodiment 7.

This embodiment comprises chip 600 having the same configuration as that in embodiment 3 shown in FIG. 6, interposer 200, and chip 900.

In this embodiment also, the wiring of interposer 200 is short and has a low resistance. Therefore, when transmission circuit 610 applies a positive or negative current $I_T$ to transmission coil 620 according to the transmission data Tx data, and the current $I_T$ induces a current in transmission/reception coils 210 and 220, voltage signal $V_R$ induced in reception coil 920 has a waveform that is a first-order derivative of the current $I_T$.

Reception circuit 910, reception coil 920 and a component (not shown) that functions as a memory or as other kinds of devices are mounted on chip 900.

Reception circuit 910 has hysteresis comparator 911 having the same configuration as hysteresis comparator 511 according to embodiment 2 shown in FIG. 4.

As described above, transmission circuit 610 applies the pulse current $I_T$ of positive polarity to transmission coil 620 when the transmission data Tx data changes from LOW to HIGH or from HIGH to LOW. The polarity of the pulse current $I_T$ does not alternate between positive and negative but is always positive. Consequently, the polarity of the double-pulse reception signal $V_R$ is always the same and is not inverted.

The voltage signal $V_R$ induced in reception coil 920 has a double-pulse waveform that is a first-order derivative of the current $I_T$ as shown in FIG. 15.

Reception circuit 910 has a comparator to which the opposite ends of reception coil 920 are connected, such as hysteresis comparator 911. Reception circuit outputs the reception data Rx data via a D-type flip-flop (referred to also as a frequency divider circuit) that serves as a sequential circuit that inverts the output in response to the rising edge (the point in time of a change from LOW to HIGH) or the falling edge (the point in time of a change from HIGH to LOW) of the output signal of hysteresis comparator 911.

As with hysteresis comparator 511 described above, hysteresis comparator 911 comprises an amplifier circuit comprising a CMOS inverter comprising a pMOS transistor P1 and an nMOS transistor N1 and a CMOS inverter comprising a pMOS transistor P2 and an nMOS transistor N2 and a latch circuit formed by cross-coupling the gates of a pMOS transistor P3 connected in parallel with the pMOS transistor P1 and a pMOS transistor P4 connected in parallel with the pMOS transistor P2 to output terminals of the CMOS inverters, for example.

The latch circuit changes the threshold voltage of the inverters according to data held therein. For example, when the latch circuit latches a low-level signal N1, the output is not inverted unless an inverted input having a greater absolute value than the logical threshold voltage of the CMOS inverters occurs, because of the current supply action of the pMOS transistor P3, and the apparent threshold voltage of hysteresis comparator 911 increases.

Once the latched data is inverted, the output is not inverted unless an inverted input having a greater absolute value than the logical threshold voltage of the CMOS inverters occurs, because of the current supply action of the pMOS transistor P4, and the apparent threshold voltage of hysteresis comparator 911 decreases.

In this way, hysteresis comparator 911 changes the input threshold voltage each time the logical value of the output signal is inverted. As shown in FIG. 15, hysteresis comparator 911 outputs a pulse signal each time the transmission data Tx data changes.

The dashed line shown along with the waveform of the voltage signal $V_R$ indicates the threshold voltage of hysteresis comparator 911. The duration of the pulse signal is approximately $0.5\tau$. The transmission data is reproduced by the frequency divider circuit outputting digital data that is alternately inverted in time with the rising edge or the falling edge of the pulse signal.

As described above, in reception circuit 910, a double-pulse voltage signal, such as a signal including a crest and a trough, is induced in reception coil 920 in response to a single-pulse current. The voltage signal does not depend on the polarity of the transmission data Tax data but on the direction of the transmission current and the way of inductive coupling. Hysteresis comparator 911 detects the voltage signal and generates a single-pulse signal of a single polarity, such as a crest pulse signal. Since the signal does not depend on the polarity of the transmission data but on the direction of the transmission current and the way of inductive coupling, hysteresis comparator 911 only outputs a signal and detects that the reception data has been changed.

As described above, reception circuit 910 transmits and receives only a change in data, so that the reception data cannot be recovered unless first data, which may be 0 or 1, is prescribed in advance in transmission and reception. The threshold voltage of hysteresis comparator 911 has to be initially set according to the polarities (a combination of a crest and a trough or a combination of a trough and a crest) of the received double-pulse voltage signal and does not relate to the polarity of the transmission/reception data. Symmetrically designing the differential stage of hysteresis comparator 911 is not enough to ensure that the output voltage or the input threshold of hysteresis comparator 911 will be set at a particular value immediately after power is turned on, because of variations among devices.

To ensure that, as in embodiment 3, the first transmission data after reset can be set at 0 or 1 in advance.

Embodiment 8

Figure 16:
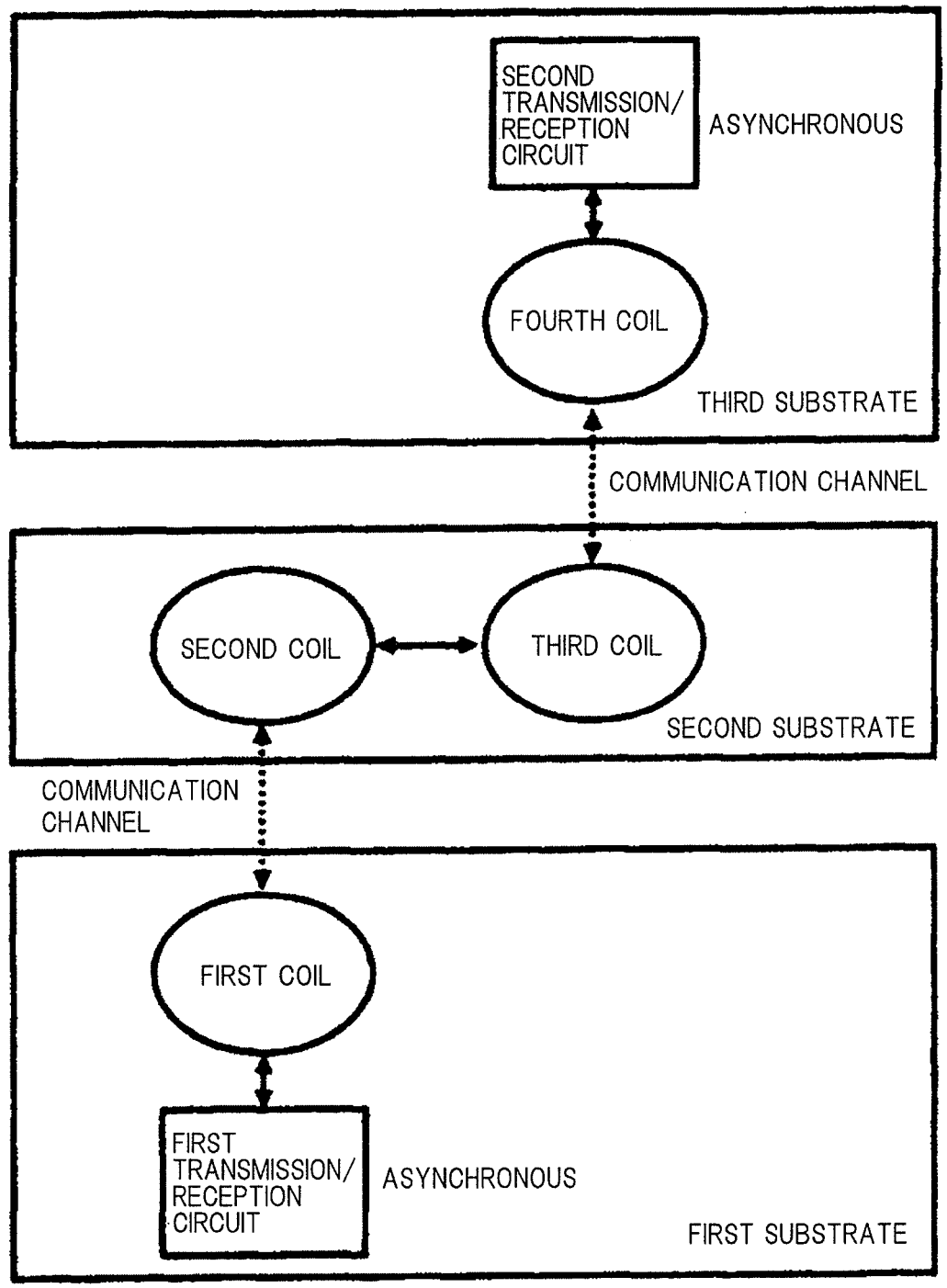
FIG. 16 is a diagram for illustrating an embodiment 8 of the present invention.

FIG. 16 is a diagram for illustrating an embodiment 8 of the present invention.

FIG. 16 shows a basic configuration of embodiment 8 of the present invention using embodiments 1 to 7 described above.

A first transmission/reception circuit and a first coil are mounted on a first substrate (chip), and a second transmission/reception circuit and a fourth coil are mounted on a third substrate (chip). A second substrate (interposer) is disposed between the substrates, and a second coil forming a communication channel with the first coil and a third coil forming a communication channel with the fourth coil are provided on the second substrate.

In embodiments 1 to 7, there have been described examples in which a transmission signal from one chip is transmitted to the other chip via the interposer. However, these examples are intended to simplify the explanation, and the transmission circuit or the reception circuit can be replaced with a transmission/reception circuit to achieve bidirectional communication as shown in FIG. 16.

Embodiment 9

Figure 17:
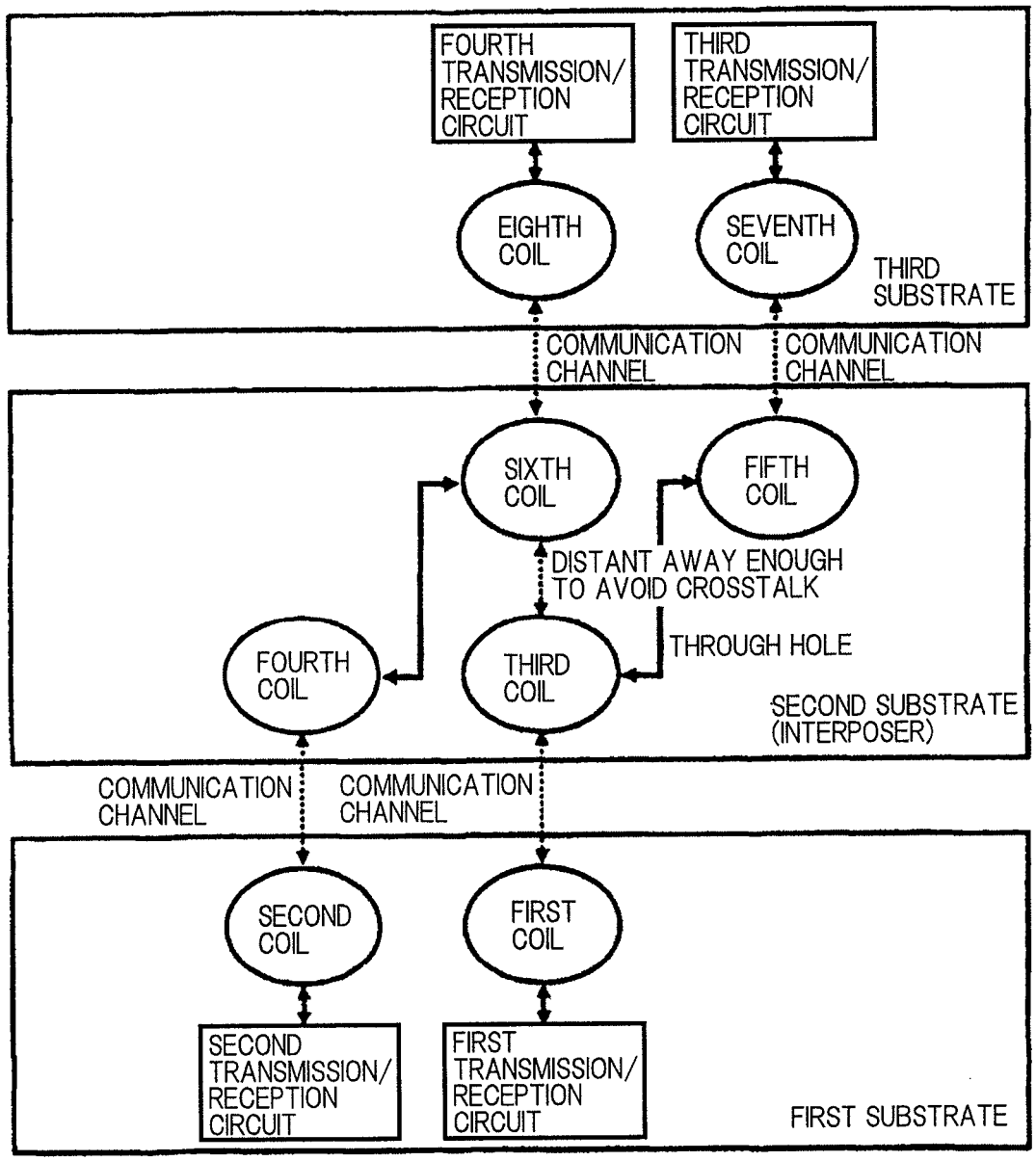
FIG. 17 is a diagram showing a basic configuration of embodiment 9 of the present invention.
Figure 18:
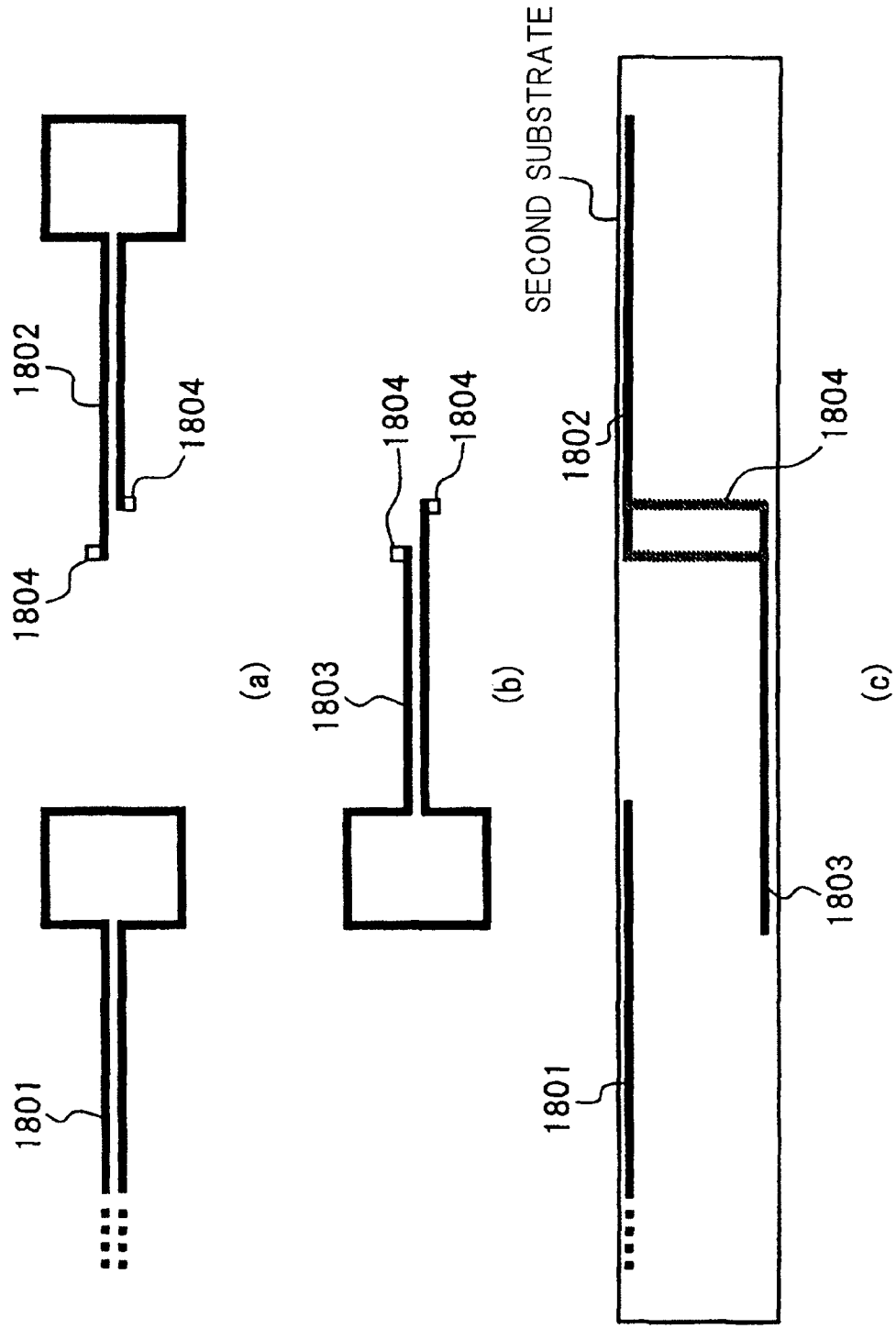
FIG. 18 includes diagrams for illustrating a configuration of a second substrate (interposer) shown in FIG. 17.
Figure 19:
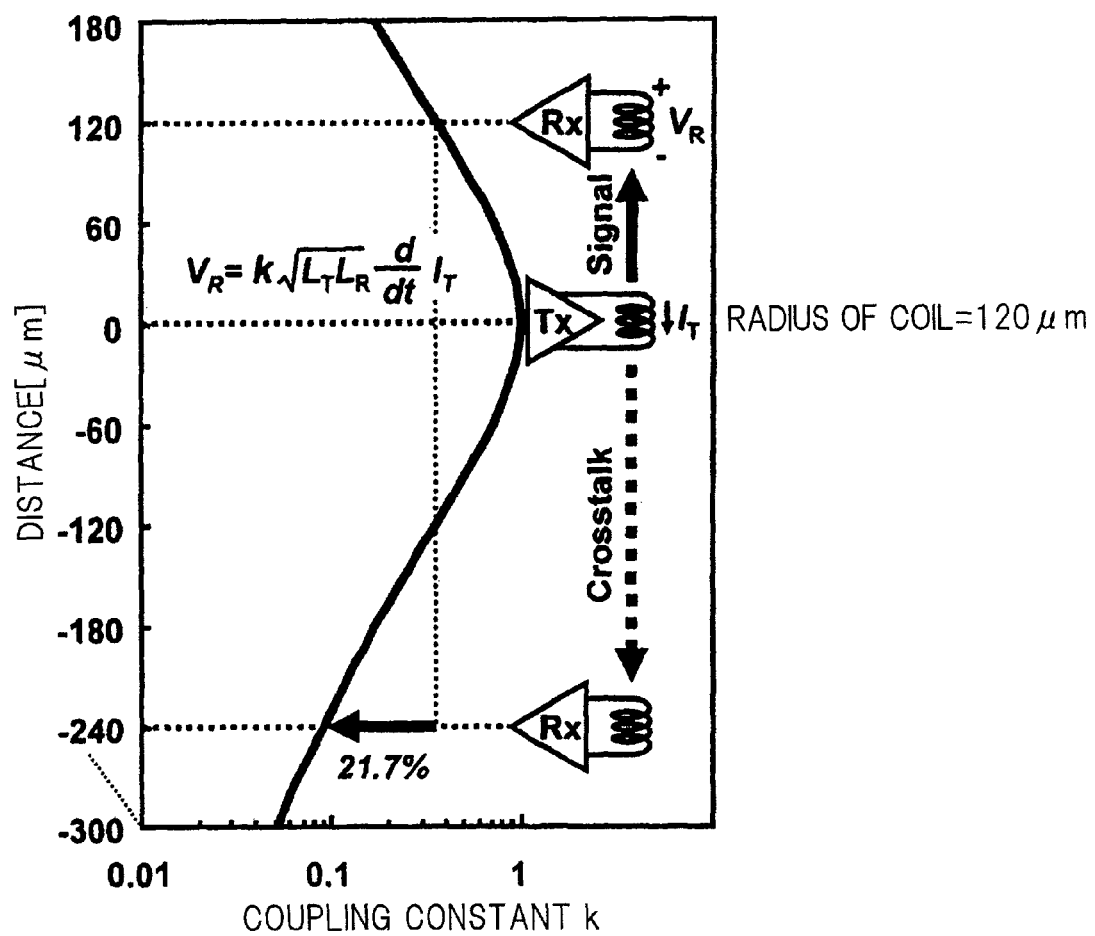
FIG. 19 is a graph showing electrical characteristics of embodiment 9.

FIGS. 17 to 19 are diagrams for illustrating embodiment 9 of the present invention. FIG. 17 shows a basic configuration of embodiment 9, FIG. 18 show a configuration of a second substrate (interposer) shown in FIG. 17, and FIG. 19 shows electrical characteristics of embodiment 9.

A first transmission/reception circuit, a second transmission/reception circuit, a first coil and a second coil are mounted on a first substrate (chip), and a third transmission/reception circuit, a fourth transmission/reception circuit, a seventh coil and an eighth coil are mounted on a third substrate (chip). A second substrate (interposer) is disposed between the substrates, and a third coil forming a communication channel with the first coil, a fourth coil forming a communication channel with the second coil, a fifth coil forming a communication channel with the seventh coil and a sixth coil forming a communication channel with the eighth coil are provided on the second substrate. The third coil is connected to the fifth coil, and the fourth coil is connected to the sixth coil.

Configured as described above, this embodiment provides two communication systems: a communication system formed by the first transmission/reception circuit, the first coil, the third coil, the fifth coil, the seventh coil and the third transmission/reception circuit, and a communication system formed by the second transmission/reception circuit, the second coil, the fourth coil, the sixth coil, the eighth coil and the fourth transmission/reception circuit.

For example, consider a case where the second substrate serving as the interposer is placed between the first substrate and the third substrate. It is assumed that the thickness of the first substrate and the third substrate is 40 μm, and the thickness of the adhesive used in stacking the substrates is 10 μm.

In the following description, it is assumed that the substrates are stacked as shown in FIG. 17. That is, the second substrate is placed on the first substrate, the third substrate is placed on the second substrate, the first transmission/reception circuit, the second transmission/reception circuit, the first coil and the second coil are placed on the surface of the first substrate facing the second substrate, the third coil and the fourth coil are placed on the surface of the second substrate facing the first substrate, the fifth coil and the sixth coil are placed on the surface of the second substrate facing the third substrate, and the seventh coil, the eighth coil, the third transmission/reception circuit and the fourth transmission/reception circuit are placed on the surface of the third substrate facing the second substrate.

FIGS. 18(a) and 18(b) show coils formed on the different surfaces of the second substrate, and FIG. 18(c) is a cross-sectional view showing a configuration of the second substrate. As shown in FIGS. 18(a) and 18(b), coils are formed by wires 1801 to 1803 on the opposite surfaces of the second substrate, and the wires on the opposite surfaces are connected to each other via through hole 1804.

The distance between the first coil on the first substrate and the third coil formed on the lower surface of the second substrate is about 10 μm, and the distance between the fifth coil formed on the upper surface of the second substrate and the seventh coil on the third substrate is 50 μm.

Consider a case where the second coil on the first substrate is coupled with the eighth coil on the third substrate via the fourth coil and the sixth coil on the second substrate, and a crosstalk occurs between the sixth coil and the third coil because the central axes of the coils are close to each other.

In this case, since the third coil is formed on the lower surface (the surface closer to the first substrate) of the second substrate, and the sixth coil is formed on the upper surface (the surface closer to the third substrate) of the second substrate, the distance between the coils is approximately equal to the distance between the wires on the opposite surfaces of the second substrate or, in other words, the thickness of the second substrate.

Typically, to achieve good communication between a pair of coils, the coils must have a radius equal to or greater than the communication distance. On the other hand, according to a simulation, the signal strength in the case where the communication distance is twice as long as the radius of the coils is about 20% of the signal strength in the case where the communication distance is equal to the radius of the coils, as shown in FIG. 19. Therefore, if the communication distance is twice as long as the radius of the coils (that is, equal to the diameter, 100 μm) or longer, the crosstalk can be adequately prevented to avoid malfunction.

That is, the crosstalk can be adequately reduced by setting the distance between the coils formed on the opposite surfaces of the second substrate (that is, the thickness of the second substrate) to be equal to or greater than the diameter of the coils (100 μm in this example).

Embodiment 10

Figure 20:
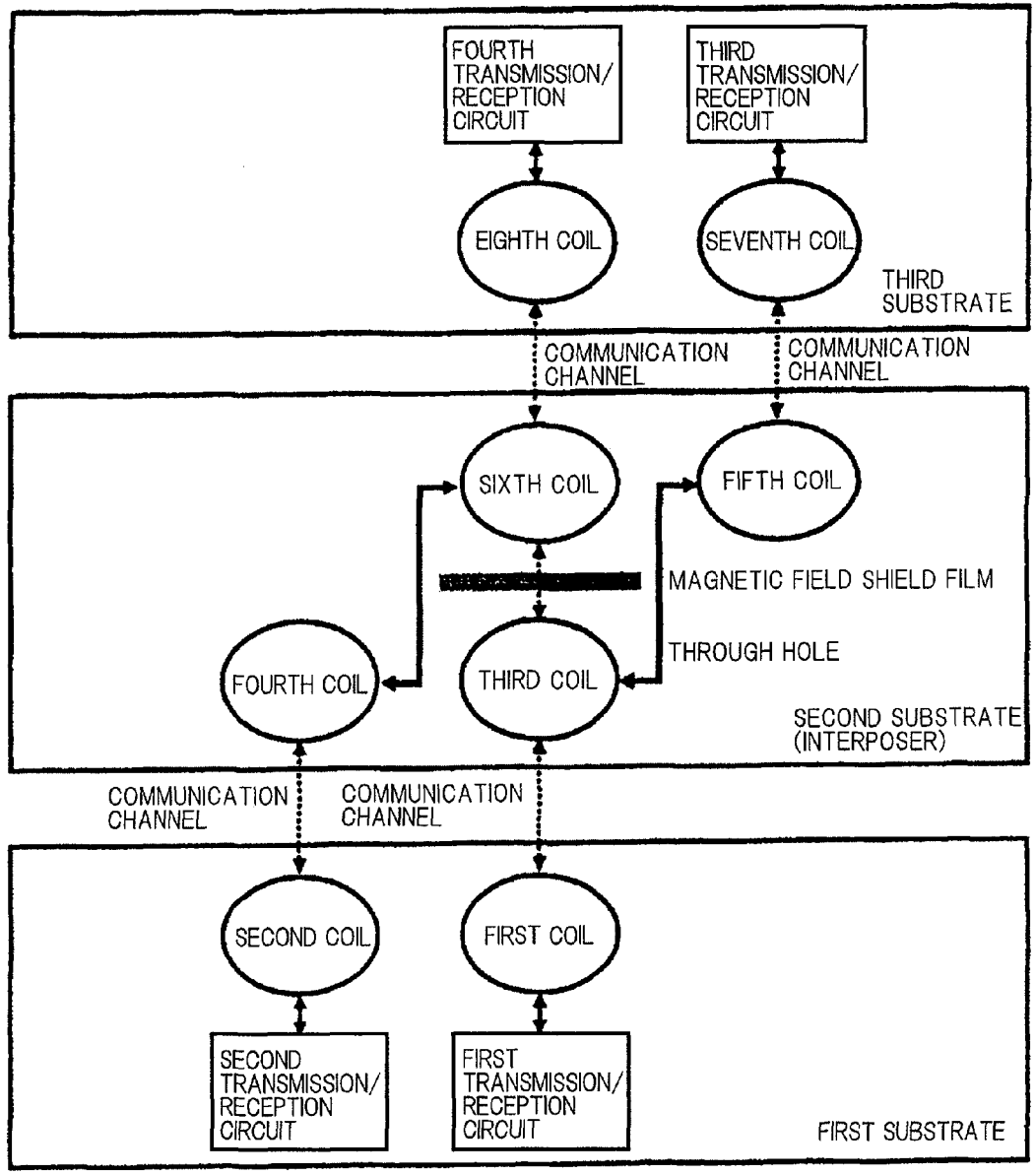
FIG. 20 is a diagram showing a basic configuration of embodiment 10 of the present invention.

FIGS. 20 and 21 are diagrams for illustrating embodiment 10 of the present invention. FIG. 20 shows a basic configuration of embodiment 10, and FIG. 21 shows a configuration of a second substrate (interposer) shown in FIG. 20.

In this embodiment, as shown in FIG. 20, a magnetic field shield film for magnetic field attenuation is additionally disposed between the sixth coil and the third coil in the structure of embodiment 9 shown in FIG. 17, thereby significantly reducing an unwanted inductive coupling while avoiding reduction of a required inductive coupling.

FIGS. 21(a) and 21(c) show coils formed on the different surfaces of the second substrate, and FIG. 21(d) is a cross-sectional view showing a configuration of the second substrate. As shown in FIGS. 21(a) and 21(c), coils are formed by wires 2101 to 2103 on the opposite surfaces of the second substrate, and the wires on the opposite surfaces are connected to each other via through hole 2104.

The configuration of the second substrate is the same as the second substrate in the embodiment 9 in the above-described respects. However, this embodiment differs from the second embodiment in that metal film 2005 serving as a magnetic field shield film shown in FIG. 21(b) is disposed in the second substrate.

An electromagnetic field analysis simulation conducted on the assumption that the distances between the metal film and the sixth coil and between the metal film and the third coil are 25 μm (that is, the thickness of the second substrate is about 50 μm), the distance between the sixth coil and the eighth coil is 50 μm, and the diameter of the sixth coil and the third coil is 100 μm (a typical size suitable for communication) shows that the metal film can reduce the coupling between the sixth coil and the third coil, which are not intended to be inductively coupled, to 0.05 while maintaining the coupling between the sixth coil and the eighth coil, which are intended to be inductively coupled, at 0.8.

The electromagnetic field analysis simulation also shows that the metal film for magnetic field attenuation has a maximum signal-to-nose ratio when the metal film is somewhat larger than the transmission/reception coils.

Therefore, by using the second substrate having three wiring layers, two of which are formed on the opposite surfaces, and the remaining one of which is formed on an intermediate layer in the substrate by a metal film somewhat larger than the coils, the coupling between the coils can be reduced to suppress the crosstalk.

In the embodiment described above, the substrates are stacked on one another. However, the first substrate and the third substrate may be disposed side by side on the second substrate (interposer).

Although the present invention by the inventor has been described with regard to specific embodiments thereof, the present invention is not limited to those specific embodiments, and various modifications can be made without departing from the spirit of the present invention.

REFERENCE SIGNS LIST 100, 300 chip
110 transmission circuit
120 transmission coil
200 interposer
210, 220 transmission/reception coil
310 reception circuit
320 reception coil

The invention claimed is:

1. An electronic circuit, comprising:
a first substrate having a first coil that is formed by a wire and transmits a signal and a first transmission circuit that is connected to the first coil and asynchronously outputs the signal to the first coil, said first transmission circuit changes a current that is to be made to flow to said first coil each time a logical value of transmission data changes;

a second substrate having a second coil that is formed by a wire at a position corresponding to said first coil and forms a communication channel with said first coil to receive the signal and a third coil that is connected to said second coil by a wire on the substrate and transmits the signal: and a third substrate having a fourth coil that is formed by a wire at a position corresponding to said third coil and forms a communication channel with said third coil to receive the signal and a first reception circuit that is connected to the fourth coil and asynchronously receives the signal from the fourth coil.

2. The electronic circuit according to claim 1, wherein said first reception circuit extracts a single-pulse signal from the received signal by comparing the received signal that comprises a plurality of pulses that are combined together with a threshold and generates said transmission data from the single-pulse signal.

3. The electronic circuit according to claim 1, wherein said second substrate has a resistor disposed between said second coil and said third coil.

4. An electronic circuit, comprising:
a first substrate having a first coil that is formed by a wire and transmits a signal, a second coil that is formed by a wire and receives the signal, a first transmission circuit that is connected to the first coil and outputs the signal to the first coil and a first reception circuit that is connected to said second coil and receives the signal from the second coil;

a second substrate having a third coil that is formed by a wire on a first surface of the second substrate closer to said first substrate at a position corresponding to said first coil and forms a communication channel with the first coil to receive the signal, a fourth coil that is formed by a wire on said first surface at a position corresponding to said second coil and forms a communication channel with the second coil to transmit the signal, a fifth coil that is formed by a wire on a second surface of the second substrate opposite to said first surface and connected to said third coil via a through hole and transmits the signal, and a sixth coil that is formed by a wire on said second surface and connected to said fourth coil via the through hole and receives the signal; and a third substrate having a seventh coil that is formed by a wire at a position corresponding to said fifth coil and forms a communication channel with the fifth coil to receive the signal, a second reception circuit that is connected to the seventh coil and receives the signal from the seventh coil, an eighth coil that is formed at a position corresponding to said sixth coil and forms a communication channel with the sixth coil to transmit the signal, and a second transmission circuit that is connected to the eighth coil and outputs the signal to the eighth coil, wherein the distance between said first surface and said second surface of said second substrate is larger than the largest diameter from among the diameters of said third coil, said fourth coil, said fifth coil and said sixth coil to sufficiently reduce the inductive coupling between said third coil or fourth coil and said sixth coil or fifth coil.

5. An electronic circuit, comprising:
first substrate having a first coil that is formed by a wire and transmits a signal, a second coil that is formed by a wire and receives the signal, a first transmission circuit that is connected to the first coil and outputs the signal to the first coil and a first reception circuit that is connected to said second coil and receives the signal from the second coil;

a second substrate having a third coil that is formed by a wire on a first surface of the second substrate closer to said first substrate at a position corresponding to said first coil and forms a communication channel with the first coil to receive the signal, a fourth coil that is formed by a wire on said first surface at a position corresponding to said second coil and forms a communication channel with the second coil to transmit the signal, a fifth coil that is formed by a wire on a second surface of the second substrate opposite to said first surface and connected to said third coil via a through hole and transmits the signal, and a sixth coil that is formed by a wire on said second surface and connected to said fourth coil via the through hole and receives the signal, said second substrate being stacked on said first substrate;

a third substrate having a seventh coil that is formed by a wire at a position corresponding to said fifth coil and forms a communication channel with the fifth coil to receive the signal, a second reception circuit that is connected to the seventh coil and receives the signal from the seventh coil, and an eighth coil that is formed at a position corresponding to said sixth coil and forms a communication channel with the sixth coil to transmit the signal, and a second transmission circuit that is connected to the eighth coil and outputs the signal to the eighth coil, said third substrate being stacked on said second substrate; and a shield film for attenuating a magnetic field that is disposed between said third coil or fourth coil and said sixth coil or fifth coil.

6. An electronic circuit, comprising:
a first substrate having a first coil that is formed by a wire and transmits and receives a signal and a first transmission/reception circuit that is connected to the first coil and asynchronously receives and outputs the signal from and to the first coil, said first transmission/reception circuit changes a current that is to be made to flow to said first coil each time a logical value of transmission data changes;

a second substrate having a second coil that is formed by a wire at a position corresponding to said first coil and forms a communication channel with said first coil to transmit and receive the signal and a third coil that is connected to said second coil by a wire on the substrate and transmits and receives the signal; and a third substrate having a fourth coil that is formed by a wire at a position corresponding to said third coil and forms a communication channel with said third coil to transmit and receive the signal and a second transmission/reception circuit that is connected to the fourth coil and asynchronously receives and outputs the signal from and to the fourth coil.

7. The electronic circuit according to claim 6, wherein said second transmission/reception circuit extracts a single-pulse signal from the received signal by comparing the received signal that comprises a plurality of pulses that are combined together with a threshold and generates said transmission data from the single-pulse signal.

8. The electronic circuit according to claim 6, wherein said second substrate has a resistor disposed between said second coil and said third coil.

9. An electronic circuit, comprising:
a first substrate having a first coil and a second coil that are formed by a wire and transmit and receive a signal, a first transmission/reception circuit that is connected to the first coil and receives and outputs the signal from and to the first coil and a second transmission/reception circuit that is connected to said second coil and receives and outputs the signal from and to the second coil;

a second substrate having a third coil that is formed by a wire on a first surface of the second substrate closer to said first substrate at a position corresponding to said first coil and forms a communication channel with the first coil to transmit and receive the signal, a fourth coil that is formed by a wire on said first surface at a position corresponding to said second coil and forms a communication channel with the second coil to transmit and receive the signal, a fifth coil that is formed by a wire on a second surface of the second substrate opposite to said first surface and that is connected to said third coil via a through hole and transmits and receives the signal, and a sixth coil that is formed by a wire on said second surface and connected to said fourth coil via the through hole and transmits and receives the signal; and a third substrate having a seventh coil that is formed by a wire at a position corresponding to said fifth coil and forms a communication channel with the fifth coil to transmit and receive the signal, a third transmission/reception circuit that is connected to the seventh coil and receives and outputs the signal from and to the seventh coil, an eighth coil that is formed at a position corresponding to said sixth coil and forms a communication channel with the sixth coil to transmit and receive the signal, and a fourth transmission/reception circuit that is connected to the eighth coil and receives and outputs the signal from and to the eighth coil, wherein the distance between said first surface and said second surface of said second substrate is larger than the largest diameter from among the diameters of said third coil, said fourth coil, said fifth coil and said sixth coil to sufficiently reduce the inductive coupling between said third coil or fourth coil and said sixth coil or fifth coil.

10. An electronic circuit, comprising:

a first substrate having a first coil and a second coil that are formed by a wire and transmit and receive a signal, a first transmission/reception circuit that is connected to the first coil and receives and outputs the signal from and to the first coil and a second transmission/reception circuit that is connected to said second coil and receives and outputs the signal from and to the second coil;

a second substrate having a third coil that is formed by a wire on a first surface of the second substrate closer to said first substrate at a position corresponding to said first coil and forms a communication channel with the first coil to transmit and receive the signal, a fourth coil that is formed by a wire on said first surface at a position corresponding to said second coil and forms a communication channel with the second coil to transmit and receive the Signal, a fifth coil that is formed by a wire on a second surface of the second substrate opposite to said first surface and that is connected to said third coil via a through hole and transmits and receives the signal, and a sixth coil that is formed by a wire on said second surface and that is connected to said fourth coil via the through hole and transmits and receives the signal;

a third substrate having a seventh coil that is formed by a wire at a position corresponding to said fifth coil and forms a communication channel with the fifth coil to transmit and receive the signal, a third transmission/reception circuit that is connected to the seventh coil and receives and outputs the signal from and to the seventh coil, an eighth coil that is formed at a position corresponding to said sixth coil and forms a communication channel with the sixth coil to transmit and receive the signal, and a fourth transmission/reception circuit that is connected to the eighth coil and receives and outputs the signal from and to the eighth coil; and a shield film for attenuating a magnetic field that is disposed between said third coil or fourth coil and said sixth coil or fifth coil.

* * * * *